United States Patent
Van der Walt et al.

(10) Patent No.: US 11,067,335 B1
(45) Date of Patent: Jul. 20, 2021

(54) DEVICES, SYSTEMS, FACILITIES, AND PROCESSES FOR LIQUEFIED NATURAL GAS PRODUCTION

(71) Applicant: ND Global Solutions, LLC, Houston, TX (US)

(72) Inventors: Ivan Van der Walt, Conroe, TX (US); Ben Heichelbech, Houston, TX (US); Alex Thompson, Sugar Land, TX (US); Vikrum Subra, Houston, TX (US); Victor Fernandes, Katy, TX (US); Michael Abegg, Anchorage, AK (US)

(73) Assignee: NEXT CARBON SOIITTIONS, LLC, Houston, TX (US)

( * ) Notice: Subject to any disclaimer, the term of this patent is extended or adjusted under 35 U.S.C. 154(b) by 0 days.

(21) Appl. No.: 17/130,953

(22) Filed: Dec. 22, 2020

Related U.S. Application Data

(63) Continuation-in-part of application No. 17/003,567, filed on Aug. 26, 2020.

(51) Int. Cl.
*F25J 3/02* (2006.01)
*F25J 1/00* (2006.01)
(Continued)

(52) U.S. Cl.
CPC ............ *F25J 1/0022* (2013.01); *B01D 53/02* (2013.01); *B01D 53/1475* (2013.01); *F25J 1/0284* (2013.01); *F25J 3/08* (2013.01); *B01D 2252/204* (2013.01); *B01D 2257/504* (2013.01); *B01D 2257/80* (2013.01); *F25J 2205/50* (2013.01); *F25J 2220/64* (2013.01); *F25J 2220/66* (2013.01); *F25J 2220/68* (2013.01);
(Continued)

(58) Field of Classification Search
CPC ......... F25J 3/067; F25J 3/0266; F25J 1/0022; F25J 2210/80; F25J 2215/80; F25J 2220/60
See application file for complete search history.

(56) References Cited

U.S. PATENT DOCUMENTS 5,295,350 A  3/1994 Child et al.
6,180,684 B1  1/2001 Halmo et al.
(Continued)

FOREIGN PATENT DOCUMENTS

KR  20110046618  5/2011
KR  20190080357  7/2019
(Continued)

OTHER PUBLICATIONS

International Written Opinion for Intentional Application No. PCT/US2020/51269 dated Dec. 15, 2020.
(Continued)

*Primary Examiner* — Brian M King
(74) *Attorney, Agent, or Firm* — K&L Gates LLP

(57) ABSTRACT

Devices, systems, and methods for liquefied natural gas production facilities are disclosed herein. A liquefied natural gas (LNG) production facility includes a liquefaction unit that condenses natural gas vapor into liquefied natural gas; an electric-driven compression system for the refrigerant(s) in power to the liquefaction unit; and a sequestration compression unit configured to compress and convey at least one CO2-rich stream towards a sequestration site, thereby reducing the overall emissions from the LNG facility.

22 Claims, 5 Drawing Sheets

(51) Int. Cl.
  *B01D 53/02* (2006.01)
  *F25J 3/08* (2006.01)
  *F25J 1/02* (2006.01)
  *B01D 53/14* (2006.01)

(52) U.S. Cl.
  CPC ........ *F25J 2245/90* (2013.01); *F25J 2260/80* (2013.01); *F25J 2290/62* (2013.01); *F25J 2290/72* (2013.01)

(56) References Cited

U.S. PATENT DOCUMENTS

| | | | |
|---|---|---|---|
| 6,237,343 | B1 | 5/2001 | Butler |
| 6,248,794 | B1 | 6/2001 | Gleskes |
| 6,874,323 | B2 | 4/2005 | Stuttaford |
| 7,559,213 | B2 | 7/2009 | Allam et al. |
| 7,895,821 | B2 | 3/2011 | Annigeri et al. |
| 8,308,849 | B2 * | 11/2012 | Gal ................. B01D 53/62 |
| | | | 95/187 |
| 9,102,534 | B2 | 8/2015 | McKenna |
| 9,149,761 | B2 * | 10/2015 | Northrop ............ C01B 17/0404 |
| 9,377,202 | B2 | 6/2016 | Menon et al. |
| 10,060,301 | B2 | 8/2018 | Evgenyevich et al. |
| 2003/0192343 | A1 | 10/2003 | Wilding et al. |
| 2006/0058402 | A1 * | 3/2006 | Highgate ............. C10G 2/50 |
| | | | 518/726 |
| 2009/0289457 | A1 | 11/2009 | Gleasman |
| 2013/0091852 | A1 | 4/2013 | Wood et al. |
| 2017/0097189 | A1 | 4/2017 | Guy et al. |
| 2017/0131027 | A1 * | 5/2017 | Mak ...................... F25J 1/0082 |
| 2018/0038638 | A1 | 2/2018 | Guillard et al. |
| 2018/0172277 | A1 | 6/2018 | Bulat et al. |
| 2020/0056837 | A1 * | 2/2020 | Hirose .................. F25J 1/0204 |
| 2020/0191386 | A1 | 6/2020 | Harper |

FOREIGN PATENT DOCUMENTS

| | | |
|---|---|---|
| RU | 91753 | 2/2010 |
| WO | 2019136566 | 7/2019 |

OTHER PUBLICATIONS

Chapman, Kirby S. et al. "Performance, Efficiency, and Emissions Characterization of Reciprocating Internal Combustion Engines Fueled with Hydrogen/Natural Gas Blends" Final Technical Report; Oct. 1, 2004-Jun. 20, 2007.

De Robbio, Roberta, "Innovative combustion anaylsis of a micro-gas turbine burner supplied with hydrogen-natural gas mixtures" 72nd Conference of the Italian Thermal Machines Engineering Association; Sep. 2017.

Dimopoulos, C. Bach et al. "Hydrogen-natural gas blends fuelling passenger car engines: Combustion, emissions and well-to-wheels assessment" International Journal of Hydrogen Energy; 2008.

International Search Report for Intentional Application No. PCT/US2020/51269 dated Dec. 15, 2020.

Patent Search Report dated Aug. 4, 2020.

* cited by examiner

DEVICES, SYSTEMS, FACILITIES, AND PROCESSES FOR LIQUEFIED NATURAL GAS PRODUCTION

PRIORITY CLAIM AND CROSS-REFERENCE TO RELATED APPLICATIONS

This application is a continuation-in-part of U.S. patent application Ser. No. 17/003,567, filed Aug. 26, 2020, entitled LIQUID NATURAL GAS PROCESSING WITH HYDROGEN PRODUCTION, the entire contents of which are incorporated by reference herein and relied upon.

BACKGROUND

Energy facilities such as liquefied natural gas facilities and natural gas power plants contribute to greenhouse gasses. Greenhouse gases comprise various gaseous compounds including, carbon dioxide, methane, nitrous oxide, hydrofluorocarbons, perfluorocarbons, and sulfur hexafluoride, that absorb radiation, trap heat in the atmosphere, and generally contribute to undesirable environmental greenhouse effects.

Liquefied natural gas facilities and natural gas power plants often implement certain forms of hydrocarbon emissions conversion technologies, such as thermal oxidizers and flares, to convert hydrocarbon emissions into carbon dioxide. Typically liquefied natural gas facilities and natural gas power plants do not incorporate greenhouse gas removal technologies. Sources of greenhouse gases in liquefied natural gas facilities and natural gas power plants typically include gas turbine exhaust(s), thermal oxidizers, various flares, and marine vent systems.

Liquefied natural gas production facilities and related processes for producing liquefied natural gas in a facility, as well as natural gas power plants and related processes for producing natural gas power, need to improve the overall efficiency of the facility and reduce greenhouse gas emissions.

SUMMARY

In light of the disclosure herein, and without limiting the scope of the invention in any way, in a first aspect of the present disclosure, which may be combined with any other aspect listed herein unless specified otherwise, a liquefied natural gas (LNG) production facility includes a liquefaction unit and a gas turbine. The liquefaction unit condenses natural gas vapor into liquefied natural gas. A fuel to the gas turbine contains at least about 90% hydrogen by volume.

In a second aspect of the present disclosure, which may be combined with any other aspect listed herein unless specified otherwise, the LNG facility further includes an on-site hydrogen generation unit that provides hydrogen to the gas turbine.

In a third aspect of the present disclosure, which may be combined with any other aspect listed herein unless specified otherwise, the hydrogen generation unit is a steam reformer.

In a fourth aspect of the present disclosure, which may be combined with any other aspect listed herein unless specified otherwise, the LNG facility further includes at least one capture unit that generates a CO2-rich stream from the products of the steam reformer.

In a fifth aspect of the present disclosure, which may be combined with any other aspect listed herein unless specified otherwise, the LNG facility further includes a sequestration compression unit configured to compress and convey at least one CO2-rich stream from a capture unit, towards a sequestration site, thereby reducing the overall emissions from the LNG facility.

In a sixth aspect of the present disclosure, which may be combined with any other aspect listed herein unless specified otherwise, the sequestration site comprises an underground geological formation comprising an at least partially depleted hydrocarbon reservoir.

In a seventh aspect of the present disclosure, which may be combined with any other aspect listed herein unless specified otherwise, the sequestration site comprises a region on top of a seabed, said region located at a depth greater than about 3.0 kilometers below sea level.

In an eighth aspect of the present disclosure, which may be combined with any other aspect listed herein unless specified otherwise, the sequestration site comprises a region below a seabed.

In a ninth aspect of the present disclosure, which may be combined with any other aspect listed herein unless specified otherwise, the LNG facility further includes an acid gas removal unit configured to accept raw feed natural gas and to generate an acid gas stream, a flash gas stream, and a purified natural gas stream. The acid gas stream is directable to the sequestration compression unit.

In a tenth aspect of the present disclosure, which may be combined with any other aspect listed herein unless specified otherwise, the flash gas stream is directable to the sequestration compression unit.

In an eleventh aspect of the present disclosure, which may be combined with any other aspect listed herein unless specified otherwise, the flash gas stream is directable to the steam reformer for use as a feedstock to the reformer.

In a twelfth aspect of the present disclosure, which may be combined with any other aspect listed herein unless specified otherwise, the sequestration compression unit comprises a compressor driven by steam from the steam reformer.

In a thirteenth aspect of the present disclosure, which may be combined with any other aspect listed herein unless specified otherwise, the capture unit includes an amine absorber and liquid amine absorbent for absorbing CO2. The steam reformer generates excess steam. The excess steam is directable to the capture unit to provide heat for regenerating the liquid amine absorbent.

In a fourteenth aspect of the present disclosure, which may be combined with any other aspect listed herein unless specified otherwise, the capture unit includes a chilled ammonia process for absorbing CO2, the steam reformer generates excess steam, and the excess steam is directable to the capture unit to provide heat for regenerating the ammonia absorbent.

In a fifteenth aspect of the present disclosure, which may be combined with any other aspect listed herein unless specified otherwise, the acid gas removal unit includes an amine absorber and liquid amine absorbent for absorbing CO2, the steam reformer generates excess steam, and the excess steam is directable to the acid gas removal unit to provide heat for regenerating the liquid amine absorbent.

In a sixteenth aspect of the present disclosure, which may be combined with any other aspect listed herein unless specified otherwise, the acid gas removal unit includes a chilled ammonia process for absorbing CO2, the steam reformer generates excess steam, and the excess steam is directable to the acid gas removal unit to provide heat for regenerating the ammonia absorbent.

In a seventeenth aspect of the present disclosure, which may be combined with any other aspect listed herein unless specified otherwise, the LNG facility further includes a dehydration unit including a solid adsorbent, the dehydration unit configured to receive the purified natural gas stream from the acid gas removal unit and to provide a dry purified natural gas stream, the steam reformer generates excess steam, and the excess steam is directable to the dehydration unit to provide heat for regenerating the solid adsorbent.

In an eighteenth aspect of the present disclosure, which may be combined with any other aspect listed herein unless specified otherwise, the steam reformer generates excess steam, and the excess steam is directable to the sequestration unit, and the sequestration compression unit comprises a compressor driven by the excess steam from the steam reformer.

In a nineteenth aspect of the present disclosure, which may be combined with any other aspect listed herein unless specified otherwise, the steam reformer generates excess steam, and the excess steam is directable to drive a compressor.

In a twentieth aspect of the present disclosure, which may be combined with any other aspect listed herein unless specified otherwise, the sequestration compression unit comprises a compressor driven by an electric motor.

In a twenty-first aspect of the present disclosure, which may be combined with any other aspect listed herein unless specified otherwise, the sequestration compression unit comprises a compressor driven by the gas turbine.

In a twenty-second aspect of the present disclosure, which may be combined with any other aspect listed herein unless specified otherwise, the sequestration compression unit comprises a compressor driven by a hydrogen turbine configured to be driven by hydrogen from the steam reformer.

In a twenty-third aspect of the present disclosure, which may be combined with any other aspect listed herein unless specified otherwise, the LNG facility further includes a heavies removal unit, a condensation storage tank, an LNG storage tank, and an LNG loading facility. The heavies removal unit is configured to receive the dry purified natural gas stream from the dehydration unit and to produce a liquid condensate product and a vapor product. The condensation storage tank is configured to receive the liquid condensate product from the heavies removal unit, and to allow for the venting of boil off gas (BOG). The LNG storage tank is configured to receive and store LNG from the liquefaction unit, and to and to allow for the venting of BOG. The LNG loading facility is configured to receive LNG from the LNG storage tank and to transfer LNG to a marine vessel comprising a marine LNG storage tank. The LNG loading facility is further configured to allow for the venting of BOG. BOG from at least one of the condensation storage tank, the LNG storage tank, and the LNG loading facility is directable as feed to the steam reformer.

In a twenty-fourth aspect of the present disclosure, which may be combined with any other aspect listed herein unless specified otherwise, BOG from each of the condensation storage tank, the LNG storage tank, and the LNG loading facility is directable as feed to the steam reformer.

In a twenty-fifth aspect of the present disclosure, which may be combined with any other aspect listed herein unless specified otherwise, the LNG facility further includes a marine vent system adapted to receive marine vessel tank gas from a marine LNG storage tank of a marine vessel, and to direct the marine vessel tank gas to feed any of: (a) a sequestration compression unit, (b) a fuel gas conditioning unit, and (c) a steam reformer. The marine vessel tank gas comprises BOG from LNG, CO, CO2, N2 or mixtures thereof.

In a twenty-sixth aspect of the present disclosure, which may be combined with any other aspect listed herein unless specified otherwise, the seabed is located at a depth greater than about 3.0 kilometers below sea level.

In a twenty-seventh aspect of the present disclosure, which may be combined with any other aspect listed herein unless specified otherwise, a liquefied natural gas (LNG) production facility includes a liquefaction unit and a sequestration compression unit. The liquefaction unit condenses natural gas vapor into liquefied natural gas. The liquefaction unit may comprise at least one electrically driven refrigerant compressor. The sequestration compression unit is configured to compress and convey at least one CO2-rich stream towards a sequestration site, thereby reducing the overall emissions from the LNG facility.

In a twenty-eighth aspect of the present disclosure, which may be combined with any other aspect listed herein unless specified otherwise, the sequestration site comprises an underground geological formation comprising an at least partially depleted hydrocarbon reservoir.

In a twenty-ninth aspect of the present disclosure, which may be combined with any other aspect listed herein unless specified otherwise, the sequestration site comprises a region on top of a seabed, said region located at a depth greater than about 3.0 kilometers below sea level.

In a thirtieth aspect of the present disclosure, which may be combined with any other aspect listed herein unless specified otherwise, the sequestration site comprises a region below a seabed.

In a thirty-first aspect of the present disclosure, which may be combined with any other aspect listed herein unless specified otherwise, the LNG facility further includes an acid gas removal unit configured to accept raw feed natural gas and to generate an acid gas stream, a flash gas stream, and a purified natural gas stream. The acid gas stream is directable to the sequestration compression unit.

In a thirty-second aspect of the present disclosure, which may be combined with any other aspect listed herein unless specified otherwise, the flash gas stream is directable to the sequestration compression unit.

In a thirty-third aspect of the present disclosure, which may be combined with any other aspect listed herein unless specified otherwise, the sequestration compression unit comprises an electric-driven compressor.

In a thirty-fourth aspect of the present disclosure, which may be combined with any other aspect listed herein unless specified otherwise, the acid gas removal unit includes an amine absorber and liquid amine absorbent for absorbing CO2.

In a thirty-fifth aspect of the present disclosure, which may be combined with any other aspect listed herein unless specified otherwise, the LNG facility further includes a dehydration unit including a solid adsorbent. The dehydration unit is configured to receive the purified natural gas stream from the acid gas removal unit and to provide a dry purified natural gas stream.

In a thirty-sixth aspect of the present disclosure, which may be combined with any other aspect listed herein unless specified otherwise, the LNG facility further includes a heavies removal unit, a condensation storage tank, an LNG storage tank, and an LNG loading facility. The heavies removal unit is configured to receive the dry purified natural gas stream from the dehydration unit and to produce a liquid condensate product and a vapor product. The condensation storage tank is configured to receive the liquid condensate product from the heavies removal unit, and to allow for the venting of boil off gas (BOG). The LNG storage tank is configured to receive and store LNG from the liquefaction unit, and to and to allow for the venting of BOG. The LNG loading facility is configured to receive LNG from the LNG storage tank and to transfer LNG to a marine vessel comprising a marine LNG storage tank. The LNG loading facility is further configured to allow for the venting of BOG. BOG from at least one of the condensation storage tank and the LNG loading facility is directable as feed to the sequestration compression unit.

In a thirty-seventh aspect of the present disclosure, which may be combined with any other aspect listed herein unless specified otherwise, BOG from each of the condensation storage tank, the LNG storage tank, and the LNG loading facility is directable as feed to the liquefaction unit.

In a thirty-eighth aspect of the present disclosure, which may be combined with any other aspect listed herein unless specified otherwise, the LNG facility further includes a marine vent system adapted to receive marine vessel tank gas from a marine LNG storage tank of a marine vessel, and to direct the marine vessel tank gas to feed any of: (a) the sequestration compression unit, (b) the liquefaction unit, and (c) one or more facility flares. The marine vessel tank gas comprises BOG from LNG, CO, CO2, N2 or mixtures thereof.

In a thirty-ninth aspect of the present disclosure, which may be combined with any other aspect listed herein unless specified otherwise, the seabed is located at a depth greater than about 3.0 kilometers below sea level.

In a fortieth aspect of the present disclosure, which may be combined with any other aspect listed herein unless specified otherwise, the acid gas removal unit includes a chilled ammonia process with an ammonia absorbent for absorbing CO2.

In a forty-first aspect of the present disclosure, which may be combined with any other aspect listed herein unless specified otherwise, a power plant facility includes a gas turbine, at least one post-combustion capture unit, and a sequestration compression unit. The gas turbine is configured to combust a hydrocarbon fuel enriched with at least 10 percent hydrogen by volume. The at least one post-combustion capture unit generates a CO2-rich stream from the combustion products of the gas turbine. The sequestration compression unit is configured to compress and convey at least one CO2-rich stream from a post-combustion capture unit, towards a sequestration site.

In a forty-second aspect of the present disclosure, which may be combined with any other aspect listed herein unless specified otherwise, the power plant facility further includes an on-site hydrogen generation unit that provides hydrogen to the gas turbine.

In a forty-third aspect of the present disclosure, which may be combined with any other aspect listed herein unless specified otherwise, the hydrogen generation unit is a steam reformer.

In a forty-fourth aspect of the present disclosure, which may be combined with any other aspect listed herein unless specified otherwise, fuel to the gas turbine contains about 60 to 95 percent hydrogen by volume.

In a forty-fifth aspect of the present disclosure, which may be combined with any other aspect listed herein unless specified otherwise, fuel to the gas turbine contains about 75 to 90 percent hydrogen by volume.

In a forty-sixth aspect of the present disclosure, which may be combined with any other aspect listed herein unless specified otherwise, the sequestration site comprises an off-site underground geological formation comprising an at least partially depleted hydrocarbon reservoir.

In a forty-seventh aspect of the present disclosure, which may be combined with any other aspect listed herein unless specified otherwise, the hydrocarbon reservoir is only partially depleted. At least some of the transferred the CO2-rich stream is injected into the sequestration site to aid in enhanced oil recovery.

In a forty-eighth aspect of the present disclosure, which may be combined with any other aspect listed herein unless specified otherwise, the sequestration site comprises a pipeline for transporting a CO2-rich stream.

In a forty-ninth aspect of the present disclosure, which may be combined with any other aspect listed herein unless specified otherwise, the power plant facility further includes at least one capture unit that configured to provide a CO2-rich stream from the products of the steam reformer.

In a fiftieth aspect of the present disclosure, which may be combined with any other aspect listed herein unless specified otherwise, the power plant facility further includes a fuel conditioning skid configured to receive hydrogen from the hydrogen generation unit, and to receive natural gas from a natural gas pipeline source, and to provide a blended fuel to the gas turbine.

In a fifty-first aspect of the present disclosure, which may be combined with any other aspect listed herein unless specified otherwise, the power plant facility further includes a power generator that generates electricity from power supplied by the gas turbine.

In a fifty-second aspect of the present disclosure, which may be combined with any other aspect listed herein unless specified otherwise, the power plant facility further includes a sequestration compression unit configured to receive the CO2-rich stream from the capture unit configured to provide the CO2-rich stream from the products of the steam reformer, and configured to compress and convey at the CO2-rich stream towards a sequestration site.

In a fifty-third aspect of the present disclosure, which may be combined with any other aspect listed herein unless specified otherwise, the sequestration compression unit comprises an electric-driven compressor.

In a fifty-fourth aspect of the present disclosure, which may be combined with any other aspect listed herein unless specified otherwise, the power plant facility further includes a waste heat recovery unit configured to pass combustion products from the gas turbine to a post-combustion capture unit.

In a fifty-fifth aspect of the present disclosure, which may be combined with any other aspect listed herein unless specified otherwise, the power plant facility further includes a co-generation unit configured to receive heat from the waste heat recovery unit and to provide power to the power generator.

In a fifty-sixth aspect of the present disclosure, which may be combined with any other aspect listed herein unless specified otherwise, the sequestration compression unit comprises a compressor driven by steam from the waste heat recovery unit.

In a fifty-seventh aspect of the present disclosure, which may be combined with any other aspect listed herein unless specified otherwise, the post-combustion capture unit includes an amine absorber and liquid amine absorbent for absorbing CO2. Heat from the waste heat recovery unit is directable to the post-combustion capture unit to provide heat for regenerating the liquid amine absorbent.

In a fifty-eighth aspect of the present disclosure, which may be combined with any other aspect listed herein unless specified otherwise, the post-combustion capture unit includes a chilled ammonia process for absorbing CO2. The steam reformer generates excess steam. The excess steam is directable to the post-combustion capture unit to provide heat for regenerating the ammonia absorbent.

In a fifty-ninth aspect of the present disclosure, which may be combined with any other aspect listed herein unless specified otherwise, the power plant facility further includes at least one booster fan configured to receive the CO2-rich stream from the gas turbine and to convey said flue gas stream towards the post-combustion capture unit.

In a sixtieth aspect of the present disclosure, which may be combined with any other aspect listed herein unless specified otherwise, a power plant facility includes a gas turbine configured to combust a fuel comprising at least about 90% hydrogen by volume In a sixty-first aspect of the present disclosure, which may be combined with any other aspect listed herein unless specified otherwise, the power plant facility further includes an on-site hydrogen generation unit that provides hydrogen to the gas turbine.

In a sixty-second aspect of the present disclosure, which may be combined with any other aspect listed herein unless specified otherwise, the hydrogen generation unit is a steam reformer.

In a sixty-third aspect of the present disclosure, which may be combined with any other aspect listed herein unless specified otherwise, the power plant facility further includes a capture unit that configured to provide a CO2-rich stream from the products of the steam reformer.

In a sixty-fourth aspect of the present disclosure, which may be combined with any other aspect listed herein unless specified otherwise, the power plant facility further includes a sequestration compression unit configured to compress and convey the CO2-rich stream from the capture unit, towards a sequestration site.

In a sixty-fifth aspect of the present disclosure, which may be combined with any other aspect listed herein unless specified otherwise, the sequestration site comprises an off-site underground geological formation comprising an at least partially depleted hydrocarbon reservoir.

In a sixty-sixth aspect of the present disclosure, which may be combined with any other aspect listed herein unless specified otherwise, the sequestration site comprises a rail-car-mounted tank.

In a sixty-seventh aspect of the present disclosure, which may be combined with any other aspect listed herein unless specified otherwise, the sequestration site comprises a region on top of a seabed, said region located at a depth greater than about 3.0 kilometers below sea level.

In a sixty-eighth aspect of the present disclosure, which may be combined with any other aspect listed herein unless specified otherwise, the sequestration site comprises a region below a seabed.

In a sixty-ninth aspect of the present disclosure, which may be combined with any other aspect listed herein unless specified otherwise, the power plant facility further includes a fuel conditioning skid configured to receive hydrogen from the hydrogen generation unit and from an off-site hydrogen supply, and to provide fuel to the gas turbine.

In a seventieth aspect of the present disclosure, which may be combined with any other aspect listed herein unless specified otherwise, the power plant facility further includes a power generator that generates electricity from power supplied by the gas turbine.

In a seventy-first aspect of the present disclosure, which may be combined with any other aspect listed herein unless specified otherwise, the power plant facility further includes a waste heat recovery unit configured to receive combustion products from the gas turbine.

In a seventy-second aspect of the present disclosure, which may be combined with any other aspect listed herein unless specified otherwise, the power plant facility further includes a co-generation unit configured to receive heat from the waste heat recovery unit and provide power to the power generator.

In a seventy-third aspect of the present disclosure, which may be combined with any other aspect listed herein unless specified otherwise, the sequestration compression unit comprises a compressor driven by steam from the waste heat recovery unit.

In a seventy-fourth aspect of the present disclosure, which may be combined with any other aspect listed herein unless specified otherwise, the sequestration compression unit comprises a compressor drive by steam from the on-site hydrogen generation unit.

In a seventy-fifth aspect of the present disclosure, which may be combined with any other aspect listed herein unless specified otherwise, the capture unit includes an amine absorber and liquid amine absorbent for absorbing CO2. Heat from the waste heat recovery unit is directable to the capture unit to provide heat for regenerating the liquid amine absorbent.

In a seventy-sixth aspect of the present disclosure, which may be combined with any other aspect listed herein unless specified otherwise, the capture unit includes a chilled ammonia process for absorbing CO2. The steam reformer generates excess steam. The excess steam is directable to the capture unit to provide heat for regenerating the ammonia absorbent.

In a seventy-seventh aspect of the present disclosure, which may be combined with any other aspect listed herein unless specified otherwise, the seabed is located at a depth greater than about 3.0 kilometers below sea level.

In a seventy-eighth aspect of the present disclosure, which may be combined with any other aspect listed herein unless specified otherwise, a liquefied natural gas (LNG) production facility includes a liquefaction unit, a gas turbine, a hydrogen generation unit, at least one post-combustion capture unit, at least one capture unit, and a sequestration compression unit. The liquefaction unit condenses natural gas vapor into liquefied natural gas. The hydrogen generation unit includes a steam reformer, whereby at least a portion of hydrogen formed in the hydrogen generation unit is combusted, along with hydrocarbons, as fuel in the gas turbine. The at least one post-combustion capture unit generates a CO2-rich stream from the combustion products of the gas turbine. The at least one capture unit generates a CO2-rich stream from the products of the steam reformer. The sequestration compression unit is configured to compress and convey at least one CO2-rich stream from a capture unit, towards a sequestration site, thereby reducing the overall emissions from the LNG facility.

In a seventy-ninth aspect of the present disclosure, which may be combined with any other aspect listed herein unless specified otherwise, the sequestration site comprises a region on top of a seabed, said region located at a depth greater than about 3.0 kilometers below sea level.

In an eightieth aspect of the present disclosure, which may be combined with any other aspect listed herein unless specified otherwise, the sequestration site comprises a region below a seabed.

In an eighty-first aspect of the present disclosure, which may be combined with any other aspect listed herein unless specified otherwise, the seabed is located at a depth greater than about 3.0 kilometers below sea level.

In an eighty-second aspect of the present disclosure, which may be combined with any other aspect listed herein unless specified otherwise, at least one of the capture units include a chilled ammonia process for absorbing CO2. The steam reformer generates excess steam. The excess steam is directable to the capture unit to provide heat for regenerating the ammonia absorbent.

In an eighty-third aspect of the present disclosure, which may be combined with any other aspect listed herein unless specified otherwise, the LNG production facility includes at least one booster fan configured to receive a flue gas stream from the gas turbine and to convey said flue gas stream towards the capture unit.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes, and not to limit the scope of the inventive subject matter.

BRIEF DESCRIPTION OF THE FIGURES

Understanding that the figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION OF EXAMPLE EMBODIMENTS

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One of ordinary skill in the art could implement numerous alternate embodiments, which would still fall within the scope of the claims. Unless a term is expressly defined herein using the sentence "As used herein, the term '_____' is hereby defined to mean . . . " or a similar sentence, there is no intent to limit the meaning of that term beyond its plain or ordinary meaning. To the extent that any term is referred to in this patent in a manner consistent with a single meaning, that is done for sake of clarity only, and it is not intended that such claim term be limited to that single meaning. Finally, unless a claim element is defined by reciting the word "means" and a function without the recital of any structure, it is not intended that the scope of any claim element be interpreted based on the application of 35 U.S.C. § 112(f).

Figure 1:
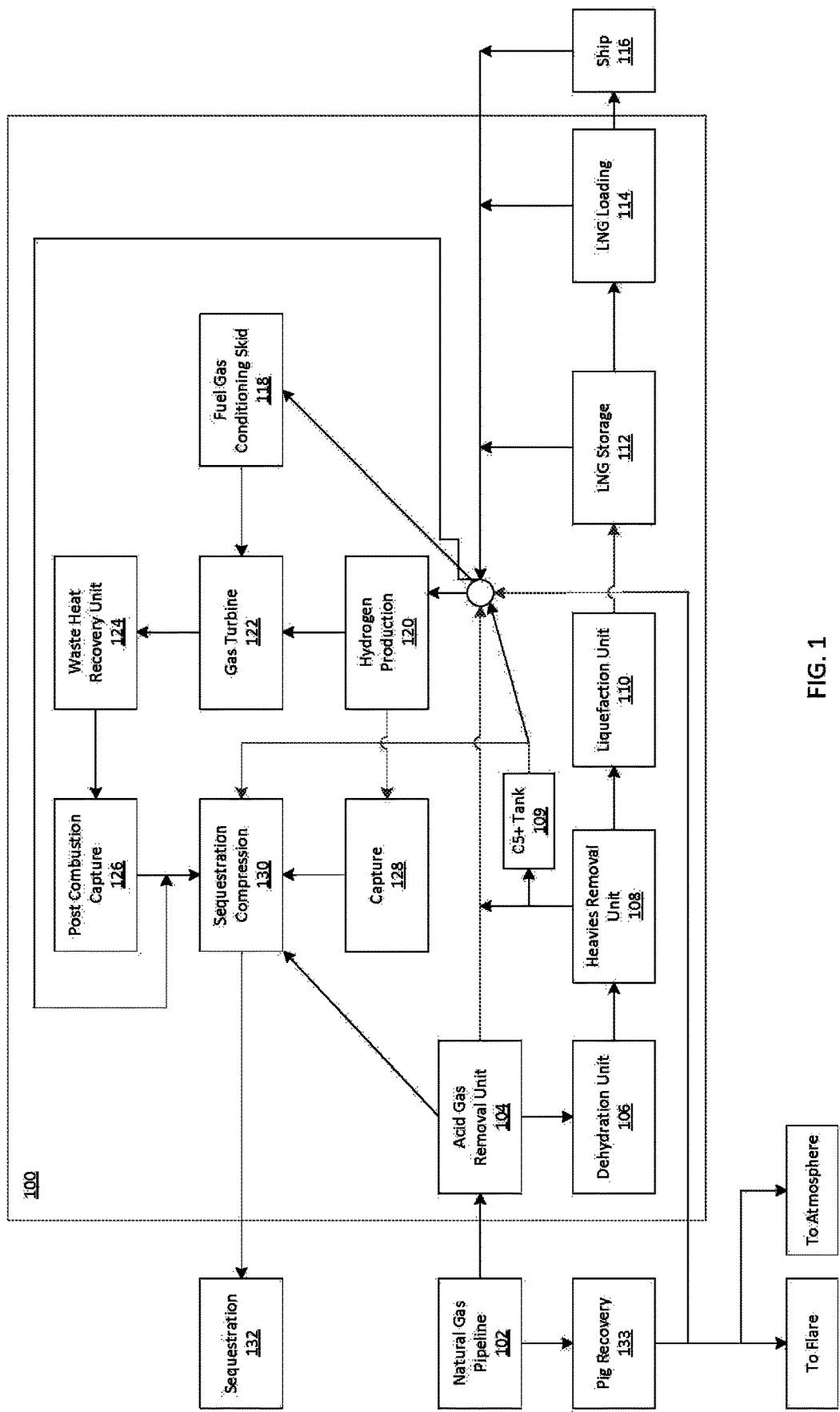
FIG. 1 illustrates an exemplary schematic of a liquefied natural gas production facility.

Referring now to the figures, FIG. 1 illustrates an exemplary schematic of a liquefied natural gas production facility 100. The facility 100 receives raw feed gas, such as natural gas, from a pipeline 102 (e.g., a natural gas pipeline).

Once received, the natural gas is sent from the pipeline 102 to an acid gas removal unit 104 within facility 100. Acid gas removal unit 104 accepts this natural gas from pipeline 102, and generates one or more of an acid gas stream, a flash gas stream, and a purified natural gas stream.

More specifically, acid gas removal unit 104 advantageously processes the natural gas to remove various contaminants, such as mercury, hydrogen-sulfide, carbon dioxide, and the like. In a particular embodiment, the acid gas removal unit 104 treats incoming natural gas, in order to remove carbon dioxide from the natural gas stream. For example, acid gas removal unit 104 may implement an amine process, which absorbs the carbon dioxide in an amine absorber. In an embodiment, acid gas removal unit 104 includes an amine absorber and liquid amine absorbent for absorbing carbon dioxide. The amine is then heated (e.g., regenerated), to return to the absorber. The carbon dioxide rich stream (also referred to generally as an acid gas stream) is separated and sent directly to sequestration compression 130, described in greater detail herein. In an embodiment, acid gas removal includes a chilled ammonia process for absorbing CO2, wherein excess steam is directable to acid gas removal to provide heat for regenerating ammonia absorbent. Advantageously, this acid gas stream is not sent to a thermal oxidizer; thus, the acid gas stream need not be combusted and released into the atmosphere via any thermal oxidation process. Similarly, acid gas removal unit 104 directs the flash gas stream to at least one of sequestration compression 130, fuel gas conditioning skid 118, and hydrogen production 120. When flash gas is sent to fuel gas conditioning skid 118, it can advantageously be used as fuel for the gas turbine 122; namely, fuel gas conditioning skid 118 may direct fuel gas to the gas turbine 122. When flash gas is sent to hydrogen production 120, it can advantageously be used by a steam reformer as feedstock for the reformer.

Upon processing by acid gas removal unit 104, the purified natural gas stream, with the carbon dioxide removed, is sent to dehydration unit 106.

More specifically, treated gas is then sent to a dehydration unit 106, which removes water from the gas. As illustrated by FIG. 1, the dehydration unit 106 is located downstream of the acid gas removal unit 104. Thus, because the amine solution of the acid gas removal unit 104 saturates the exiting feed gas with water, this water is removed in the dehydration unit 106. In an embodiment, dehydration unit 106 reduces water content of feed gas to less than 0.5 ppmv, to prevent water freeze out in the downstream cryogenic processing within facility 100.

Dehydration unit 106 may include a solid adsorbent. In an embodiment, the dehydration unit 106 is based on a three-bed molecular sieve bed configuration: two beds operating in water adsorption mode, while the third bed is being regenerated. During the adsorption process, the vapor is cooled, exits a drier feed gas filter coalescer, and passes downward through regenerated molecular sieve driers. Each externally insulated absorber vessel contains 4 A molecular sieve adsorbent, to remove water. During the regeneration process, a slip stream of product gas (dried gas) is used for regeneration. The regeneration gas passes through a drier regeneration gas compressor and a flow control valve, before it enters the regeneration gas heat exchanger, which raises the gas temperature to 550° F. The dehydration regeneration gas is heated with hot oil. In an embodiment, the hot oil is heated from the waste heat recovery units, such as waste heat recovery unit 124 described in greater detail herein.

The gas, as a dry purified natural gas stream, is next sent to a heavies removal unit 108. In an embodiment, heavies removal unit 108 is configured to receive the dry purified natural gas stream from the dehydration unit 106 and subsequently produce both a liquid condensate product and a vapor product. Specifically, heavies removal unit 108 separates condensate from gas, and sends condensate to a condensate storage tank 109. Generally, the purpose of the heavies removal unit 106 is to remove enough C5 and heavier components (including benzene) from the natural gas stream that has left the dehydration unit 106 to meet the liquid natural gas (LNG) product specification and avoid the undesirable freezing of these components during liquefaction. In an embodiment, heavies removal unit 108 includes a series of pumps, exchangers, towers, compressors, and other related processing equipment, for separating heavy components.

The heavy components (e.g., liquid condensate product) are sent to a condensate storage tank, such as C5+ tank 109. Some of this condensate will boil off, producing condensate boil off gas. This boil off gas may be sent to at least one of fuel gas conditioning skid 118 or hydrogen production 120, as disclosed in greater detail herein. Advantageously, the boil off gas is not sent to a thermal oxidizer or other flare; thus, the boil off gas is not combusted and released into the atmosphere via any thermal oxidation process.

After processing at the heavies removal unit 108, the gas is sent to a liquefaction unit 110. In an embodiment, liquefaction unit 110 is one or more refrigeration units, compressors, and/or heat exchangers, which convert the gas into LNG via cooling and condensation. For example, the temperature of the gas is lowered to approximately −260° F., thus necessitating a phase change from gas to LNG. In an embodiment, the main refrigeration compressor(s) for liquefaction unit 110 is driven by either a natural gas fired turbine or an electric motor. For example, liquefaction unit 110 may be powered, at least in part, via gas turbine 122. In an embodiment, gas turbine 122 is mechanically coupled to at least one compressor within liquefaction unit 110. In an alternative embodiment, liquefaction unit 110 comprises at least one electrically-driven compressor, and gas turbine 122 drives an electric generator to provide electric power to at least one compressor within the liquefaction unit 110.

LNG is then sent to LNG storage 112. In an embodiment, LNG storage 112 is one or more storage tanks, such as double walled tanks, which are transportable. Once in a stored-state, LNG is constantly boiling off, producing additional boil off gas, which may be sent to at least one of fuel gas conditioning skid 118 and hydrogen production 120, as disclosed in greater detail herein. Additionally or alternatively, boil off gas can be recompressed and sent back to the liquefaction unit 110.

Via LNG loading infrastructure 114, LNG is pumped out of the LNG storage tanks 112 and loaded into LNG vessels 116, via loading arms, cranes, forklifts, and other transportation means. In an particular embodiment, LNG vessel 116 is a seafaring ship with marine LNG storage tanks. Loading onto a ship typically produces additional boil off gas, which may be sent to at least one of fuel gas conditioning skid 118 and hydrogen production 120, as disclosed in greater detail herein. Advantageously, the boil off gas is not sent to a thermal oxidizer or other flare such as a marine flare. Facility 100 may further include a marine vent system, adapted to receive gas from a marine LNG storage tank on a vessel 116, and subsequently direct this ship vessel gas (e.g., boil off gas from LNG, carbon monoxide, carbon dioxide, nitrogen, or mixtures thereof) to any of post combustion capture facility 126, capture facility 128, sequestration compression 130, fuel gas conditioning skid 118, and hydrogen production 120 as appropriate.

As previously noted above, boil off gas is sent from one or more of acid gas removal unit 104, heavies removal unit 108, LNG storage 112, LNG loading 114, and ship 116 to one of at least fuel gas conditioning skid 118 and hydrogen production 120.

Fuel gas conditioning skid 118 takes streams of natural gas, such as boil off gasses, and adjusts various physical conditions (e.g., temperatures, pressures, blends, and the like) to ensure that the gasses are configured for optimal combustion in a gas turbine 122. In an embodiment, fuel gas conditioning skid 118 directs fuel gas to gas turbine 122. As previously noted, flash gas stream is directable to fuel gas conditioning skid 118 for use as fuel for gas turbine 122.

Advantageously, facility 100 further includes hydrogen production 120. In an embodiment, hydrogen production 120 is a steam reformer, such as a methane gas reformer, which is configured to generate hydrogen on-site. It should be appreciated that, in additional or alternative embodiments, hydrogen production 120 could be produced via other means, such as via an electrolysis unit whereby water is split into hydrogen and oxygen through the use of electricity. Likewise, it should be appreciated that, in additional or alternative embodiments, hydrogen production 120 could be offsite, such as via an offsite supply of hydrogen, whereby hydrogen may come into the LNG facility via pipeline, railcar, ship or other convenient means.

With that in mind, hydrogen production 120, such as via the steam reformer, allows for high temperature steam to react with methane, in the presence of a catalyst, to produce hydrogen, carbon monoxide, and carbon dioxide. With reference to FIG. 1, it should be appreciated that boil off gas from each of condensation storage tank 109, LNG storage 112, and LNG loading 114 are directable as feed to hydrogen production 120. Additional processes can be incorporated with hydrogen production 120, such as a water-gas shift reaction and/or pressure swing adsorption, to increase the yield of hydrogen.

Hydrogen may be provided to gas turbine 122 as fuel, for optimal combustion. For example, the fuel provided to gas turbine 122 may be a hydrogen-enriched hydrocarbon fuel. In an embodiment, fuel provided to gas turbine 122 contains at least 10 percent hydrogen by volume. In a preferred embodiment, fuel provided to gas turbine 122 contains about 60 to less than 100 percent hydrogen by volume. In a more preferred embodiment, fuel provided to gas turbine 122 contains about 75 to 85 percent hydrogen by volume. Excess hydrogen may be generated on-site from the steam reformer. Such hydrogen may be stored in an on-site storage tank, and may be sent off-site for consumption by others, for example, by way of pipeline, railcar, or truck-drawn trailer.

In an embodiment, facility 100 further includes one or more electric generators, whereby gas turbine 122 is coupled to the one or more electric generators; in this embodiment, facility 100 may further serve as a natural gas power generation facility.

In an embodiment, hydrogen production 120 generates excess steam, which is directable to acid gas removal unit 104; this excess steam provides heat to acid gas removal unit 104 for regenerating liquid amine absorbent. In an embodiment, hydrogen production 120 generates excess steam, which is directable to dehydration unit 106; this excess steam provides heat to dehydration unit 106 for regenerating solid adsorbent. In an embodiment, hydrogen production unit 120 generates excess steam, which is directable to drive a compressor. In a related embodiment, hydrogen production 120 generates excess steam, which is directable to sequestration compression 130; this excess steam drives a compressor at sequestration compression 130.

Once combusted, gas from the gas turbine 122 may pass to a waste heat recovery unit 124. The waste heat recovery unit 124 uses heat generated by a combustion process, such as via combustion in gas turbine 122, to heat up a heat medium (e.g., hot oil or steam). The heated medium is then used in various processes throughout facility 100 where additional heat is required (e.g., amine regeneration, dehydration regeneration, and the like).

For example, the waste heat recovery unit 124 may advantageously communicate with one or more of acid gas removal unit 104, dehydration unit 106, and heavies removal unit 108, to provide heat to these components. In an embodiment, waste heat recovery unit 124 communicates with a cogeneration unit (not illustrated), which uses the waste heat from gas turbine 122 to generate steam that, in turn, rotates a generator to produce electricity. The electricity can then be used in other parts of the facility 100 or, alternatively, be sent to the electric grid.

After heat has been recovered at waste heat recovery unit 124, gas passes to post combustion capture facility 126. In an embodiment, post combustion capture facility 126 generates a carbon dioxide rich stream from the combustion products derived from the gas turbine 122. Specifically, post combustion capture facility 126 captures the products of combustion, for example, using an amine process to absorb carbon dioxide from the flue gas stream. Specifically, it should be appreciated that there are different types of amine depending on the relative concentrations of carbon dioxide in the flue gas stream. Natural gas fired turbines typically produce a relatively less concentrated carbon dioxide stream (e.g., approximately less than 5%) as compared to a natural gas steam methane reformer 120 (e.g., approximately 25%) and thus would generally use a different mixture to absorb the carbon dioxide. Other processes can additionally or alternatively include use of ammonia or other related materials. For example, capture may include a chilled ammonia process for absorbing CO2, wherein excess steam is directable to the capture unit to provide heat for regenerating ammonia absorbent. In an embodiment, one or more booster fans are configured to receive a flue gas stream from the gas turbine 122 and to convey said flue gas stream towards the post combustion capture facility 126.

Similar to gas passing from waste heat recovery unit 124 to post combustion capture facility 126, it should be appreciated that gas from hydrogen production 120 may pass directly to capture facility 128 (or the same facility 126) and be processed as described above. Namely, capture facility 128 generates a carbon dioxide rich stream from the products of hydrogen production 120.

In an embodiment, post combustion capture facility 126 includes an amine absorber and liquid amine absorbent for absorbing carbon dioxide. In a related embodiment, hydrogen production 120 generates excess steam, which is directable to post combustion capture facility 126; this excess steam provides heat to post combustion capture facility for regenerating the liquid amine absorbent.

After post combustion capture, gas passes to sequestration compression unit 130. In other embodiments, the boil off gas streams from the condensation storage tank 109, the LNG loading 114, and the ship 116, are sent to downstream of post combustion capture facility 126 to combine with gas generated thereof before the combined gas passes to sequestration compression unit 130. In other embodiments, the boil off gas from the condensation storage tank 109, LNG storage 112, and/or the ship 116, is directly sent to the sequestration compression unit 130.

It is understood that natural gas pipelines are often make use of various pigging operations. For example, pig devices may be used in natural gas pipelines to clean the pipeline, and so-called smart pigs may be used to inspect the pipeline, and for other purposes. Pig insertion and especially pig recovery systems, located within or near facility 100, may be significant sources of emissions. Such emissions, typically of natural gas, may often be combusted in a flare or simply vented to the atmosphere. In an embodiment, emissions from pig recovery system 133 may be directed as feed to hydrogen production 120, or directed to the fuel conditioning skid 118, or directed to sequestration compression 130.

Sequestration compression unit 130 includes one or more knockout drums for collecting any remaining liquid in the gas stream. Sequestration compression unit 130 further includes at least one compressor, configured to compress the carbon dioxide rich stream, which may be then sent to a pipeline for off-site sequestration 132. By sending the carbon dioxide rich stream to some form of sequestration, overall greenhouse gas emissions from facility 100 are reduced. Other forms of sequestration (not shown in FIG. 1) may be implemented, including for example sending the CO2 rich gas to an on-site or off-site storage tank, to a tank mounted on a rail car, or a tank mounted on a truck-drawn trailer. After compression, the sequestered CO2 rich gas may advantageously be sold for a number of well-known applications and uses.

In an embodiment, sequestration compression unit 130 includes a compressor that is driven by steam generated from a steam reformer during hydrogen production 120. In a related embodiment, the compressor is driven by a hydrogen turbine configured to be driven by excess hydrogen, derived from the steam reformer during hydrogen production 120. In another embodiment, sequestration compression unit 130 includes a compressor that is driven by gas turbine 122. In yet another embodiment, sequestration compression unit 130 includes a compressor that is driven by an electric motor. Liquids from the knockout drums within sequestration compression unit 130 are sent back to C5+ storage tank 109.

As previously noted, sequestration compression unit 130 sends the carbon dioxide rich stream away from facility 100 for off-site sequestration 132. In an embodiment, sequestration 132 is an underground geological formation that includes at least a partially depleted hydrocarbon reservoir. In a related embodiment, at least some of the transferred carbon dioxide rich stream is injectable into the hydrocarbon reservoir, to aid in enhanced oil recovery. In another example, the sequestration site is a region on top of a seabed, at a depth greater than three kilometers below sea level. In yet another example, the sequestration site is a region below a seabed. In yet another example, the sequestration site is a region below a seabed, wherein the seabed is located at a depth greater than about 3.0 kilometers below sea level.

Figure 2:
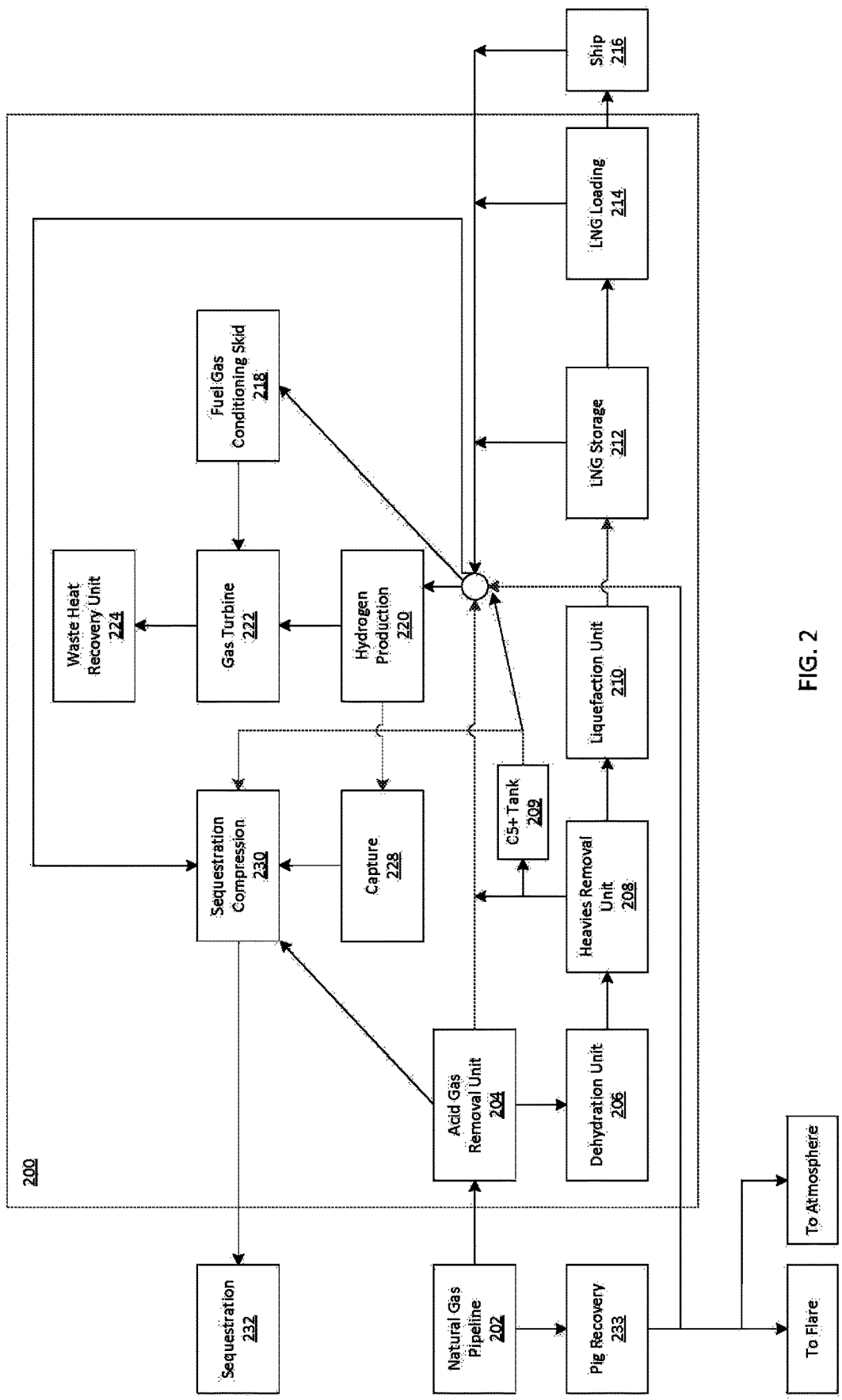
FIG. 2 illustrates an exemplary schematic of a liquefied natural gas production facility, using at least about 90% hydrogen by volume as fuel to the gas turbine.

FIG. 2 illustrates an exemplary schematic of a liquefied natural gas production facility 200, using at least about 90% hydrogen by volume as fuel to the gas turbine. The facility 200 receives raw feed gas, such as natural gas, from a pipeline 202 (e.g., a natural gas pipeline).

Once received, the natural gas is sent from the pipeline 202 to an acid gas removal unit 204 within facility 200. Acid gas removal unit 204 accepts this natural gas from pipeline 202, and generates one or more of an acid gas stream, a flash gas stream, and a purified natural gas stream.

More specifically, acid gas removal unit 204 advantageously processes the natural gas to remove various contaminants, such as mercury, hydrogen-sulfide, carbon dioxide, and the like. In a particular embodiment, the acid gas removal unit 204 treats incoming natural gas, in order to remove carbon dioxide from the natural gas stream. For example, acid gas removal unit 204 may implement an amine process, which absorbs the carbon dioxide in an amine absorber. In an embodiment, acid gas removal unit 204 includes an amine absorber and liquid amine absorbent for absorbing carbon dioxide. The amine is then heated (e.g., regenerated), to return to the absorber. The carbon dioxide rich stream (also referred to generally as an acid gas stream) is separated and sent directly to sequestration compression 230, described in greater detail herein. In an embodiment, acid gas removal includes a chilled ammonia process for absorbing CO2, wherein excess steam is directable to acid gas removal to provide heat for regenerating ammonia absorbent. Advantageously, this acid gas stream is not sent to a thermal oxidizer; thus, the acid gas stream need not be combusted and released into the atmosphere via any thermal oxidation process. Similarly, acid gas removal unit 204 directs the flash gas stream to at least one of sequestration compression 230, and hydrogen production 220. When flash gas is sent to hydrogen production 220, it can advantageously be used by a steam reformer as feedstock for the reformer.

Upon processing by acid gas removal unit 204, the purified natural gas stream, with the carbon dioxide removed, is sent to dehydration unit 206.

More specifically, treated gas is then sent to a dehydration unit 206, which removes water from the gas. As illustrated by FIG. 2, the dehydration unit 206 is located downstream of the acid gas removal unit 204. Thus, because the amine solution of the acid gas removal unit 204 saturates the exiting feed gas with water, this water is removed in the dehydration unit 206. In an embodiment, dehydration unit 206 reduces water content of feed gas to less than 0.5 ppmv, to prevent water freeze out in the downstream cryogenic processing within facility 200.

Dehydration unit 206 may include a solid adsorbent. In an embodiment, the dehydration unit 206 is based on a three-bed molecular sieve bed configuration: two beds operating in water adsorption mode, while the third bed is being regenerated. During the adsorption process, the vapor is cooled, exits a drier feed gas filter coalescer, and passes downward through regenerated molecular sieve driers. Each externally insulated absorber vessel contains 4 A molecular sieve adsorbent, to remove water. During the regeneration process, a slip stream of product gas (dried gas) is used for regeneration. The regeneration gas passes through a drier regeneration gas compressor and a flow control valve, before it enters the regeneration gas heat exchanger, which raises the gas temperature to 550° F. The dehydration regeneration gas is heated with hot oil. In an embodiment, the hot oil is heated from the waste heat recovery units, such as waste heat recovery unit 224 described in greater detail herein.

The gas, as a dry purified natural gas stream, is next sent to a heavies removal unit 208. In an embodiment, heavies removal unit 208 is configured to receive the dry purified natural gas stream from the dehydration unit 206 and subsequently produce both a liquid condensate product and a vapor product. Specifically, heavies removal unit 208 separates condensate from gas, and sends condensate to a condensate storage tank 209. Generally, the purpose of the heavies removal unit 206 is to remove enough C5 and heavier components (including benzene) from the natural gas stream that has left the dehydration unit 206 to meet the liquid natural gas (LNG) product specification and avoid the undesirable freezing of these components during liquefaction. In an embodiment, heavies removal unit 208 includes a series of pumps, exchangers, towers, compressors, and other related processing equipment, for separating heavy components.

The heavy components (e.g., liquid condensate product) are sent to a condensate storage tank, such as C5+ tank 209. Some of this condensate will boil off, producing condensate boil off gas. This boil off gas may be sent to hydrogen production 220, as disclosed in greater detail herein. Advantageously, the boil off gas is not sent to a thermal oxidizer or other flare; thus, the boil off gas is not combusted and released into the atmosphere via any thermal oxidation process.

After processing at the heavies removal unit 208, the gas is sent to a liquefaction unit 210. In an embodiment, liquefaction unit 210 is one or more refrigeration units, compressors, and/or heat exchangers, which convert the gas into LNG via cooling and condensation. For example, the temperature of the gas is lowered to approximately −260° F., thus necessitating a phase change from gas to LNG. In an embodiment, the main refrigeration compressor(s) for liquefaction unit 210 is driven by a gas fired turbine. For example, liquefaction unit 210 may be powered, at least in part, via gas turbine 222. As with the embodiment in FIG. 1 described above, for example, liquefaction unit 210 may be powered, at least in part, via gas turbine 222. In an embodiment, gas turbine 222 is mechanically coupled to at least one compressor within liquefaction unit 210. In an alternative embodiment, liquefaction unit 210 comprises at least one electrically-driven compressor, and gas turbine 222 drives an electric generator to provide electric power to at least one compressor within the liquefaction unit 210.

LNG is then sent to LNG storage 212. In an embodiment, LNG storage 212 is one or more storage tanks, such as double walled tanks, which are transportable. Once in a stored-state, LNG is constantly boiling off, producing additional boil off gas, which may be sent to hydrogen production 220, as disclosed in greater detail herein. Additionally or alternatively, boil off gas can be recompressed and sent back to the liquefaction unit 210.

Via LNG loading infrastructure 214, LNG is pumped out of the LNG storage tanks 212 and loaded into LNG vessels 216, via loading arms, cranes, forklifts, and other transportation means. In an particular embodiment, LNG vessel 216 is a seafaring ship with marine LNG storage tanks. Loading onto a ship typically produces additional boil off gas, which may be sent to hydrogen production 220, as disclosed in greater detail herein. Advantageously, the boil off gas is not sent to a thermal oxidizer or other flare such as a marine flare. Facility 200 may further include a marine vent system, adapted to receive gas from a marine LNG storage tank on a vessel 216, and subsequently direct this ship vessel gas (e.g., boil off gas from LNG, carbon monoxide, carbon dioxide, nitrogen, or mixtures thereof) to any of capture facility 228, sequestration compression 230, fuel gas conditioning skid 218, and hydrogen production 220 as appropriate.

As previously noted above, boil off gas is sent from one or more heavies removal unit 208, LNG storage 212, LNG loading 214, and ship 216 to one of at least fuel gas conditioning skid 218 and hydrogen production 220.

Fuel gas conditioning skid 218 takes streams of natural gas, such as boil off gasses, and adjusts various physical conditions (e.g., temperatures, pressures, blends, and the like) to ensure that the gasses are configured for optimal combustion in a gas turbine 222. In an embodiment, fuel gas conditioning skid 218 directs fuel gas to gas turbine 222. As previously noted, flash gas stream is directable to fuel gas conditioning skid 218 for use as fuel for gas turbine 222.

Advantageously, facility 200 further includes hydrogen production 220. In an embodiment, hydrogen production 220 is a steam reformer, such as a methane gas reformer, which is configured to generate hydrogen on-site. It should be appreciated that, in additional or alternative embodiments, hydrogen production 220 could be produced via other means, such as via an electrolysis unit whereby water is split into hydrogen and oxygen through the use of electricity. Likewise, it should be appreciated that, in additional or alternative embodiments, hydrogen production 220 could be offsite, such as via an offsite supply of hydrogen, whereby hydrogen may come into the LNG facility via pipeline, railcar, ship or other convenient means. In an embodiment, facility 200 uses at least about 90% hydrogen, by volume, as fuel to the gas turbine 222. In a related embodiment, the remaining balance (i.e., up to about 10% by volume) of the fuel gas stream may also include CO2, N2 and/or oxygen in any proportions.

With that in mind, hydrogen production 220, such as via the steam reformer, allows for high temperature steam to react with methane, in the presence of a catalyst, to produce hydrogen, carbon monoxide, and carbon dioxide. With reference to FIG. 2, it should be appreciated that boil off gas from each of condensation storage tank 209, LNG storage 212, and LNG loading 214 are directable as feed to hydrogen production 220. Additional processes can be incorporated with hydrogen production 220, such as a water-gas shift reaction and/or pressure swing adsorption, to increase the yield of hydrogen.

Hydrogen may be provided to gas turbine 222 as fuel, for optimal combustion. For example, the fuel provided to gas turbine 222 may be a hydrogen-enriched hydrocarbon fuel. In an embodiment, fuel provided to gas turbine 222 contains at least 10 percent hydrogen by volume. In a preferred embodiment, fuel provided to gas turbine 222 contains about 60 to less than 100 percent hydrogen by volume. In a more preferred embodiment, fuel provided to gas turbine 222 contains about 75 to 85 percent hydrogen by volume. In a further more preferred embodiment, fuel provided to gas turbine 222 contains at least about 90% hydrogen by volume. Excess hydrogen may be generated on-site from the steam reformer. Such hydrogen may be stored in an on-site storage tank, and may be sent off-site for consumption by others, for example, by way of pipeline, railcar, or truck-drawn trailer.

In an embodiment, facility 200 further includes one or more electric generators, whereby gas turbine 222 is coupled to the one or more electric generators; in this embodiment, facility 200 may further serve as a natural gas power generation facility.

In an embodiment, hydrogen production 220 generates excess steam, which is directable to acid gas removal unit 204; this excess steam provides heat to acid gas removal unit 204 for regenerating liquid amine absorbent. In an embodiment, hydrogen production 220 generates excess steam, which is directable to dehydration unit 206; this excess steam provides heat to dehydration unit 206 for regenerating solid adsorbent. In an embodiment, hydrogen production unit 220 generates excess steam, which is directable to drive a compressor. In a related embodiment, hydrogen production 220 generates excess steam, which is directable to sequestration compression 230; this excess steam drives a compressor at sequestration compression 230.

Once combusted, gas from the gas turbine 222 may pass to a waste heat recovery unit 224. The waste heat recovery unit 224 uses heat generated by a combustion process, such as via combustion in gas turbine 222, to heat up a heat medium (e.g., hot oil or steam). The heated medium is then used in various processes throughout facility 200 where additional heat is required (e.g., amine regeneration, dehydration regeneration, and the like).

For example, the waste heat recovery unit 224 may advantageously communicate with one or more of acid gas removal unit 204, dehydration unit 206, and heavies removal unit 208, to provide heat to these components. In an embodiment, waste heat recovery unit 224 communicates with a cogeneration unit (not illustrated), which uses the waste heat from gas turbine 222 to generate steam that, in turn, rotates a generator to produce electricity. The electricity can then be used in other parts of the facility 200 or, alternatively, be sent to the electric grid. Combusted gas from the gas turbine 222 may eventually be vented to the atmosphere. Since the combustion gas from the gas turbine 222 is relatively low in carbon dioxide and other greenhouse gases, for example, as low as about 3.0% by volume, or more preferably as low as about 1.5% by volume, this stream of combusted gas need not be further treated in a post-combustion capture unit to remove carbon dioxide, and the overall greenhouse gas emissions from facility 200 will not be greatly increased by such venting of combustion gases to the atmosphere.

Meanwhile, a carbon dioxide containing gas from hydrogen production 220 passes to capture facility 228. In an embodiment, capture facility 228 generates a carbon dioxide rich stream from the products derived from hydrogen production 220. Specifically, capture facility 228 captures, for example, using an amine process to absorb carbon dioxide from the flue gas stream. Specifically, it should be appreciated that there are different types of amine depending on the relative concentrations of carbon dioxide in the flue gas stream. Natural gas fired turbines typically produce a relatively less concentrated carbon dioxide stream (e.g., approximately less than 5%) as compared to a natural gas steam methane reformer 220 (e.g., approximately 25%) and thus would generally use a different mixture to absorb the carbon dioxide. Other processes can additionally or alternatively include use of ammonia or other related materials. For example, capture may include a chilled ammonia process for absorbing CO2, wherein excess steam is directable to the capture unit to provide heat for regenerating ammonia absorbent.

In an embodiment, capture facility 228 includes an amine absorber and liquid amine absorbent for absorbing carbon dioxide. In a related embodiment, hydrogen production 220 generates excess steam, which is directable to capture facility 228; this excess steam provides heat to capture facility for regenerating the liquid amine absorbent.

After capture, gas passes to sequestration compression unit 230. More specifically, sequestration compression unit 230 includes one or more knockout drums for collecting any remaining liquid in the gas stream. Sequestration compression unit 230 further includes at least one compressor, configured to compress the carbon dioxide rich stream, which may be then sent to a pipeline for off-site sequestration 232. By sending the carbon dioxide rich stream to some form of sequestration, overall greenhouse gas emissions from facility 200 are reduced. Other forms of sequestration (not shown in FIG. 2) may be implemented, including for example sending the CO2 rich gas to an on-site or off-site storage tank, to a tank mounted on a rail car, or a tank mounted on a truck-drawn trailer. After compression, the sequestered CO2 rich gas may advantageously be sold for a number of well-known applications and uses.

In an embodiment, sequestration compression unit 230 includes a compressor that is driven by steam generated from a steam reformer during hydrogen production 220. In a related embodiment, the compressor is driven by a hydrogen turbine configured to be driven by excess hydrogen, derived from the steam reformer during hydrogen production 220. In another embodiment, sequestration compression unit 230 includes a compressor that is driven by gas turbine 222. In yet another embodiment, sequestration compression unit 230 includes a compressor that is driven by an electric motor. Liquids from the knockout drums within sequestration compression unit 230 are sent back to C5+ storage tank 209.

In other embodiments, the boil off gas from the condensation storage tank 209, the LNG loading 214, and/or the ship 216, is directly sent to the sequestration compression unit 130.

As with the LNG facility 100 described above, natural gas pipeline 202 providing natural gas to LNG facility 200 may have associated with it one or more pig recovery systems 233 or other pig-related systems, which may be significant sources of emissions that would typically be flared and/or vented to the atmosphere. In an embodiment, emissions from pig recovery system 233 are directed as feed to hydrogen production 220, directed to the fuel conditioning skid 218, and/or directed to sequestration compression 230.

As previously noted, sequestration compression unit 230 sends the carbon dioxide rich stream away from facility 200 for off-site sequestration 232. In an embodiment, sequestration 232 is an underground geological formation that includes at least a partially depleted hydrocarbon reservoir. In a related embodiment, at least some of the transferred carbon dioxide rich stream is injectable into the hydrocarbon reservoir, to aid in enhanced oil recovery. In another example, the sequestration site is a region on top of a seabed, at a depth greater than three kilometers below sea level. In yet another example, the sequestration site is a region below a seabed, or other dispositions as disclosed herein.

Figure 3:
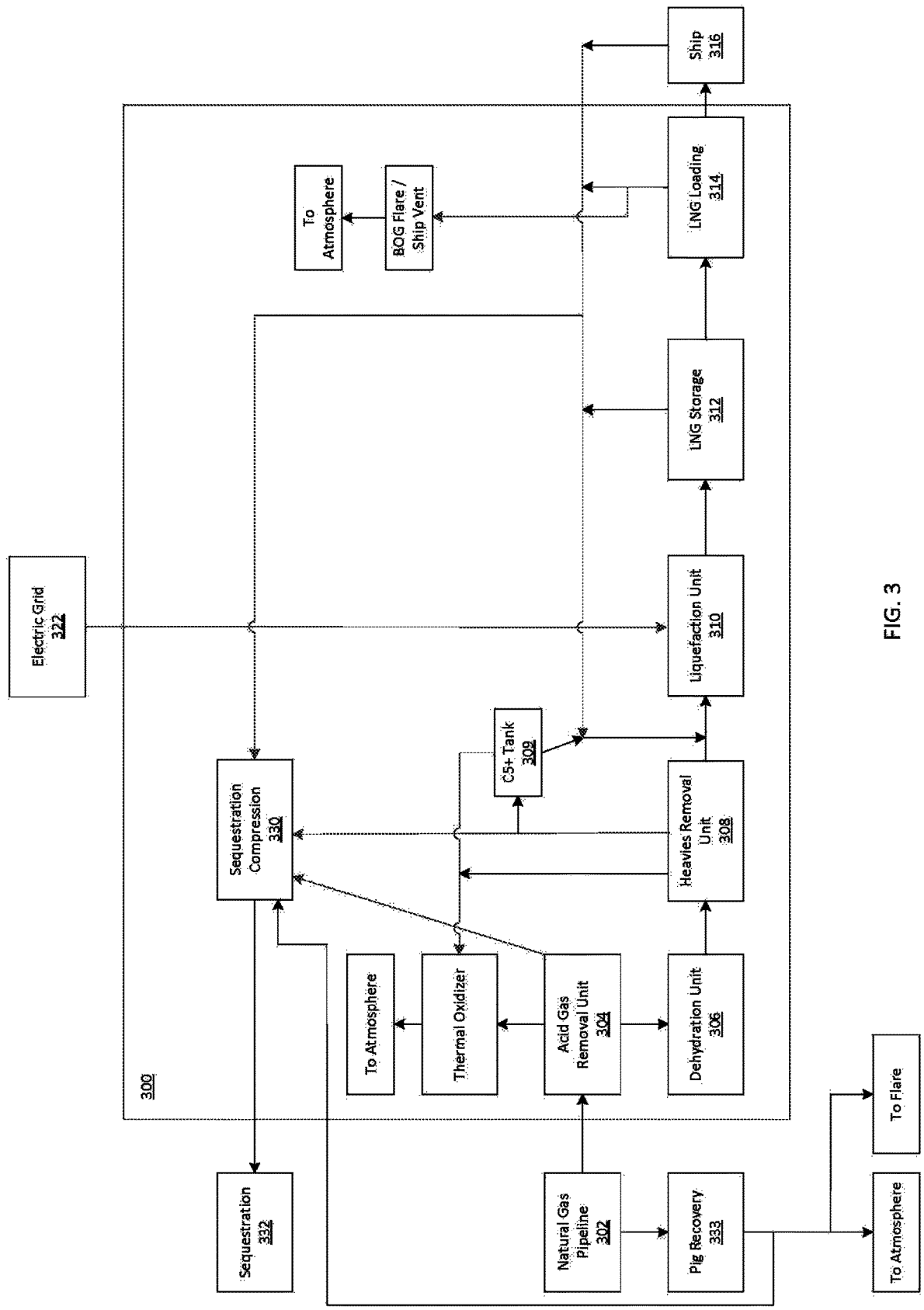
FIG. 3 illustrates an exemplary schematic of a liquefied natural gas production facility, with electric driven compressors.

FIG. 3 illustrates an exemplary schematic of a liquefied natural gas production facility 300, with electric driven compressors. The facility 300 receives raw feed gas, such as natural gas, from a pipeline 302 (e.g., a natural gas pipeline).

Once received, the natural gas is sent from the pipeline 302 to an acid gas removal unit 304 within facility 300. Acid gas removal unit 304 is similar to acid gas removal units 104, 204 (discussed above), accepting this natural gas from pipeline 302, and generating one or more of an acid gas stream, a flash gas stream, and a purified natural gas stream. The carbon dioxide rich acid gas stream is separated and sent directly to sequestration compression 330, described in greater detail herein.

Upon processing by acid gas removal unit 304, the purified natural gas stream, with the carbon dioxide removed, is sent to dehydration unit 306.

More specifically, treated gas is then sent to a dehydration unit 306, which removes water from the gas. As illustrated by FIG. 3, the dehydration unit 306 is located downstream of the acid gas removal unit 304. Thus, because the amine solution of the acid gas removal unit 304 saturates the exiting feed gas with water, this water is removed in the dehydration unit 306. In an embodiment, dehydration unit 106 reduces water content of feed gas to less than 0.5 ppmv, to prevent water freeze out in the downstream cryogenic processing within facility 300. Dehydration unit 306 may include a solid adsorbent, similar to dehydration units 106, 206.

The gas, as a dry purified natural gas stream, is next sent to a heavies removal unit 308. In an embodiment, heavies removal unit 308 is configured to receive the dry purified natural gas stream from the dehydration unit 306 and subsequently produce both a liquid condensate product and a vapor product. Specifically, heavies removal unit 308 separates condensate from gas, and sends condensate to a condensate storage tank 309. Generally, the purpose of the heavies removal unit 306 is to remove enough C5 and heavier components (including benzene) from the natural gas stream that has left the dehydration unit 306 to meet the liquid natural gas (LNG) product specification and avoid the undesirable freezing of these components during liquefaction. In an embodiment, heavies removal unit 308 includes a series of pumps, exchangers, towers, compressors, and other related processing equipment, for separating heavy components.

The heavy components (e.g., liquid condensate product) are sent to a condensate storage tank, such as C5+ tank 309. Some of this condensate will boil off, producing condensate boil off gas. In a traditional liquefied natural gas production facility, the boil off gas from the condensate storage tank, or the heavies removal unit may be sent to a thermal oxidizer to be combusted and then released to the atmosphere. However, in an embodiment, this boil off gas is sent to sequestration compression 330, as disclosed in greater detail herein. Advantageously, the boil off gas is not sent to a thermal oxidizer or other flare; thus, the boil off gas is not combusted and released into the atmosphere via any thermal oxidation process.

After processing at the heavies removal unit 308, the gas is sent to a liquefaction unit 310. The boil off gas from the condensate storage tank 309 and the heavies removal unit 308, may alternatively be sent to the liquefaction unit 310.

In an embodiment, liquefaction unit 310 is one or more refrigeration units, compressors, and/or heat exchangers, which convert the gas into LNG via cooling and condensation. For example, the temperature of the gas is lowered to approximately −260° F., thus necessitating a phase change from gas to LNG. In an embodiment, the main refrigeration compressor(s) for liquefaction unit 310 is driven by an electric motor powered by the electric grid 322.

LNG is then sent to LNG storage 312. In an embodiment, LNG storage 312 is one or more storage tanks, such as double walled tanks, which are transportable. Once in a stored-state, LNG is constantly boiling off, producing additional boil off gas, which may be recompressed and sent back to the liquefaction unit 310.

Via LNG loading infrastructure 314, LNG is pumped out of the LNG storage tanks 312 and loaded into LNG vessels 316, via loading arms, cranes, forklifts, and other transportation means. In a particular embodiment, LNG vessel 316 is a seafaring ship with marine LNG storage tanks. Loading onto a ship typically produces additional boil off gas, which may be recompressed and sent back to the liquefaction unit 310. Advantageously, the boil off gas is not sent to a thermal oxidizer or other flare such as a marine flare. Facility 300 may further include a marine vent system, adapted to receive gas from a marine LNG storage tank on a vessel 316, and subsequently direct this ship vessel gas (e.g., boil off gas from LNG, carbon monoxide, carbon dioxide, nitrogen, or mixtures thereof) to recompression and back to liquefaction unit 310. Traditionally, the boil off gas from the LNG storage tanks 312, loading infrastructure 314 and LNG vessels 316, be sent to flare or ship vent system and released to the atmosphere.

However, in certain embodiments, such boil off gas can be passed directly to sequestration compression unit 330. That is, the boil off gas from the condensation storage tank 309, the LNG loading 314, and/or the vessel 316 can be passed directly to the sequestration compression unit 330.

Sequestration compression unit 330 includes one or more knockout drums for collecting any remaining liquid in the gas stream. Sequestration compression unit 330 further includes at least one compressor, configured to compress the carbon dioxide rich stream, which may be then sent to a pipeline for off-site sequestration 332. By sending the carbon dioxide rich stream to some form of sequestration, overall greenhouse gas emissions from facility 300 are reduced. Other forms of sequestration (not shown in FIG. 3) may be implemented, including for example sending the CO2 rich gas to an on-site or off-site storage tank, to a tank mounted on a rail car, or a tank mounted on a truck-drawn trailer. After compression, the sequestered CO2 rich gas may advantageously be sold for a number of well-known applications and uses.

In an embodiment, sequestration compression unit 330 includes a compressor that is driven by steam or, alternatively, driven by power via electric grid 322. In yet another embodiment, sequestration compression unit 330 includes a compressor that is driven by an electric motor. Liquids from the knockout drums within sequestration compression unit 330 are sent back to C5+ storage tank 309.

As with the LNG facilities 100 and 200 described above, natural gas pipeline 302 providing natural gas to LNG facility 300 may have associated with it one or more pig recovery systems 333 or other pig-related systems, which may be significant sources of emissions that would typically be flared and/or vented to the atmosphere. In an embodiment, emissions from pig recovery system 333 are directed to sequestration compression 330.

As previously noted, sequestration compression unit 330 sends the carbon dioxide rich stream away from facility 300 for off-site sequestration 332. In an embodiment, sequestration 332 is an underground geological formation that includes at least a partially depleted hydrocarbon reservoir. In a related embodiment, at least some of the transferred carbon dioxide rich stream is injectable into the hydrocarbon reservoir, to aid in enhanced oil recovery. In another example, the sequestration site is a region on top of a seabed, at a depth greater than three kilometers below sea level. In yet another example, the sequestration site is a region below a seabed, or other dispositions as disclosed herein.

Figure 4:
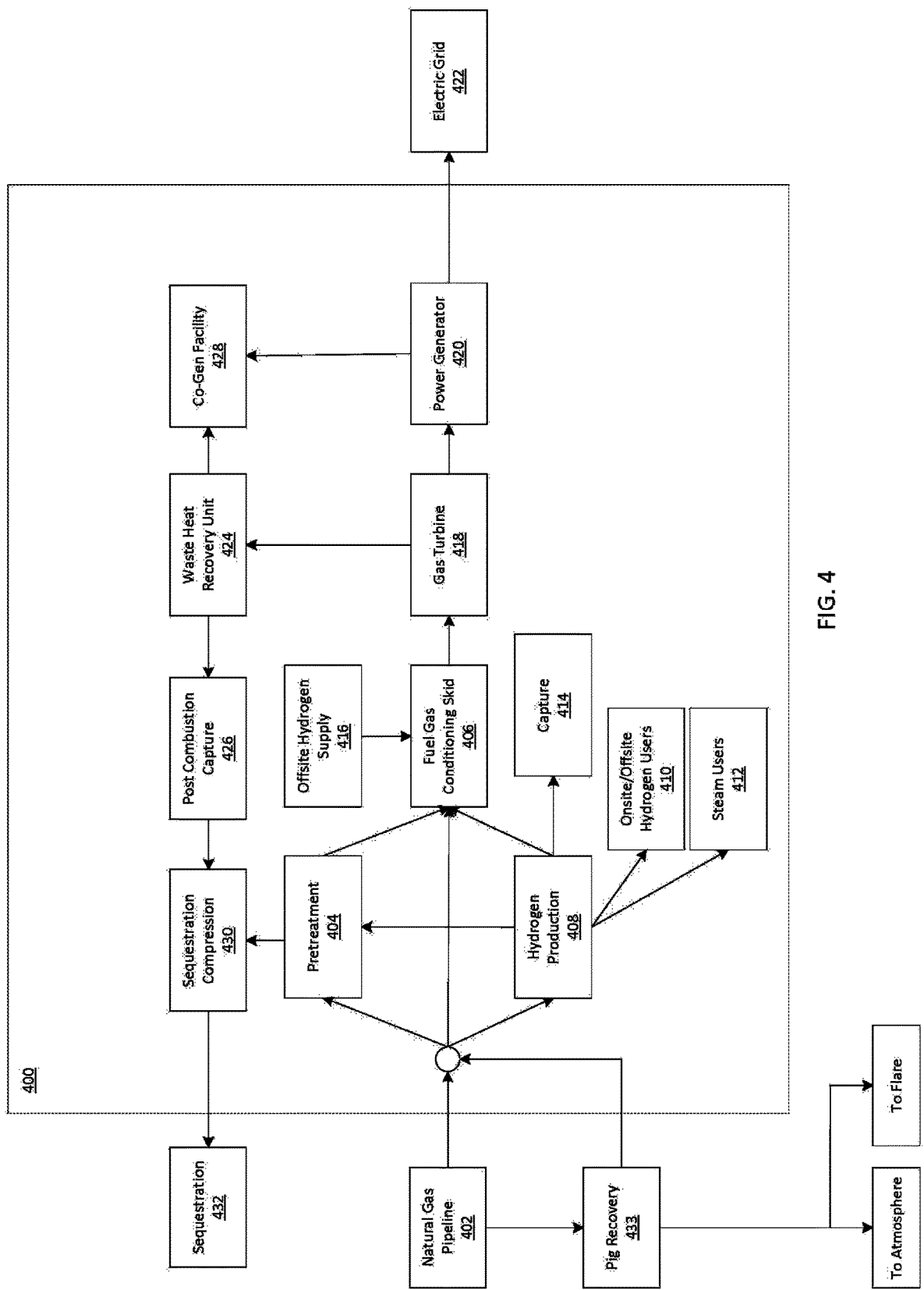
FIG. 4 illustrates an exemplary schematic of a power plant with gas turbine post-combustion capture and hydrogen production.

FIG. 4 illustrates an exemplary schematic of a power plant 400 with gas turbine post-combustion capture and hydrogen production. Specifically, power plant 400 receives raw feed gas, such as natural gas, from a pipeline 402 (e.g., a natural gas pipeline).

As with the LNG facilities described above, natural gas pipeline 402 providing natural gas to facility 400 may have associated with it one or more pig recovery systems 433 or other pig-related systems, which may be significant sources of emissions that would typically be flared and/or vented to the atmosphere. In an embodiment, emissions from pig recovery system 433 are directed to facility 400 for use as natural gas feedstock.

Once received, the natural gas is sent from the pipeline 402 to a number of different locations, including pretreatment 404, fuel gas conditioning skid 406, and hydrogen production 408. More specifically, gas is sent from pipeline 402 to pretreatment 404, to be treated prior to being sent to fuel gas conditioning skid 406. At pretreatment 404, the gas may be processed to remove various contaminants, such as mercury, hydrogen-sulfide, carbon dioxide, and the like.

If gas does not need pretreatment, it may pass directly to fuel gas conditioning skid 406. When gas is sent to fuel gas conditioning skid 406, it can advantageously be used as fuel for the gas turbine 418; namely, fuel gas conditioning skid 406 may direct fuel gas to the gas turbine 418. Fuel gas conditioning skid 406 takes streams of natural gas and adjusts various physical conditions (e.g., temperatures, pressures, blends, and the like) to ensure that the gasses are configured for optimal combustion in a gas turbine 418.

Similarly, when gas is sent to hydrogen production 408, it can advantageously be used by a steam reformer as feedstock for the reformer. Specifically, in an embodiment, hydrogen production 408 is a steam reformer, such as a methane gas reformer, which is configured to generate hydrogen on-site. It should be appreciated that, in additional or alternative embodiments, hydrogen production 408 could be produced via other means, such as via an electrolysis unit whereby water is split into hydrogen and oxygen through the use of electricity. Likewise, it should be appreciated that, in additional or alternative embodiments, hydrogen production 408 could be offsite, such as via an offsite supply of hydrogen, whereby hydrogen may come into the power generation facility via pipeline, railcar, ship or other convenient means.

With that in mind, hydrogen production 408, such as via the steam reformer, allows for high temperature steam to react with methane, in the presence of a catalyst, to produce hydrogen, carbon monoxide, and carbon dioxide. Additional processes can be incorporated with hydrogen production 408, such as a water-gas shift reaction and/or pressure swing adsorption, to increase the yield of hydrogen.

Hydrogen may be provided to gas turbine 418 as fuel (or to the fuel gas conditioning skid 406 prior to the gas turbine 418), for optimal combustion. It should be appreciated that additional hydrogen may be provided, beyond the supply from hydrogen production 408, such as from offsite hydrogen supply 416.

Continuing on with respect to hydrogen production 408, for example, the fuel provided to gas turbine 418 may be a hydrogen-enriched hydrocarbon fuel. In an embodiment, fuel provided to gas turbine 418 contains at least 10 percent hydrogen by volume. In a preferred embodiment, fuel provided to gas turbine 418 contains about 60 to less than 100 percent hydrogen by volume. In a more preferred embodiment, fuel provided to gas turbine 418 contains about 75 to 85 percent hydrogen by volume. Excess hydrogen may be generated on-site from the steam reformer. Such hydrogen may be stored in an on-site storage tank, and may be sent for consumption by others such as onsite/offsite hydrogen users 410 within plant 400. Moreover, excess steam from hydrogen production 408 may be directed to various steam user 412, such as those described above. A carbon dioxide containing stream from hydrogen production 408 may also pass to capture facility 414, which is similar to the capture facilities 128, 228 (discussed above). In an embodiment, capture facility 414 generates a carbon dioxide rich stream from the products derived from hydrogen production 408, and passes the carbon dioxide rich stream to sequestration compression 430.

In an embodiment, plant 400 further includes one or more power generators 420, such as electric generators, whereby gas turbine 418 is coupled to the one or more electric generators 420; in this embodiment, facility 400 functions as a natural gas power generation facility. Namely, power from gas turbine 418 is transferred to power generator 420, which delivers this electricity to an external electric grid 422.

Once combusted, gas from the gas turbine 418 may pass to a waste heat recovery unit 424. The waste heat recovery unit 424 uses heat generated by a combustion process, such as via combustion in gas turbine 418, to heat up a heat medium (e.g., hot oil or steam). The heated medium is then used in various processes throughout facility 400 where additional heat is required (e.g., amine regeneration, dehydration regeneration, and the like for pretreatment 400).

In an embodiment, waste heat recovery unit 424 communicates with a cogeneration unit 428, which uses the waste heat from gas turbine 418 to generate steam that, in turn, rotates a generator, such as power generator 420 or another generator. The electricity can then be used in other parts of the facility 400 or, alternatively, be sent to the electric grid 422.

After heat has been recovered at waste heat recovery unit 424, gas passes to post combustion capture facility 426. In an embodiment, post combustion capture facility 426 generates a carbon dioxide rich stream from the combustion products derived from the gas turbine 418. Specifically, post combustion capture facility 426 captures the products of combustion, for example, using an amine process to absorb carbon dioxide from the flue gas stream. Specifically, it should be appreciated that there are different types of amine depending on the relative concentrations of carbon dioxide in the flue gas stream. Natural gas fired turbines typically produce a relatively less concentrated carbon dioxide stream (e.g., approximately less than 5%) as compared to a natural gas steam methane reformer 408 (e.g., approximately 25%) and thus would generally use a different mixture to absorb the carbon dioxide. Other processes can additionally or alternatively include use of ammonia or other related materials. For example, capture may include a chilled ammonia process for absorbing $CO_2$, wherein excess steam is directable to the capture unit to provide heat for regenerating ammonia absorbent. In an embodiment, one or more booster fans are configured to receive a flue gas stream from the gas turbine 418 and to convey said flue gas stream towards the post combustion capture facility 426.

Similar to gas passing from waste heat recovery unit 424 to post combustion capture facility 426, it should be appreciated that carbon dioxide containing gas from hydrogen production 408 may pass directly to post combustion capture facility 426 and be processed as described above. Namely, post combustion capture facility 426 generates a carbon dioxide rich stream from the products of hydrogen production 408.

In an embodiment, post combustion capture facility 426 includes an amine absorber and liquid amine absorbent for absorbing carbon dioxide. In a related embodiment, hydrogen production 408 generates excess steam, which is directable to post combustion capture facility 426; this excess steam provides heat to post combustion capture facility for regenerating the liquid amine absorbent.

After post combustion capture, gas passes to sequestration compression unit 430. More specifically, sequestration compression unit 430 includes one or more knockout drums for collecting any remaining liquid in the gas stream. Sequestration compression unit 430 further includes at least one compressor, configured to compress the carbon dioxide rich stream, which may be then sent to a pipeline for off-site sequestration 432. By sending the carbon dioxide rich stream to some form of sequestration, overall greenhouse gas emissions from facility 400 are reduced. Other forms of sequestration (not shown in FIG. 4) may be implemented, including for example sending the CO2 rich gas to an on-site or off-site storage tank, to a tank mounted on a rail car, or a tank mounted on a truck-drawn trailer. After compression, the sequestered CO2 rich gas may advantageously be sold for a number of well-known applications and uses.

In an embodiment, sequestration compression unit 430 includes a compressor that is driven by steam generated from a steam reformer during hydrogen production 408. In a related embodiment, the compressor is driven by a hydrogen turbine configured to be driven by excess hydrogen, derived from the steam reformer during hydrogen production 408. In another embodiment, sequestration compression unit 430 includes a compressor that is driven by gas turbine 418. In yet another embodiment, sequestration compression unit 430 includes a compressor that is driven by an electric motor.

As previously noted, sequestration compression unit 430 sends the carbon dioxide rich stream away from facility 400 for off-site sequestration 432. In an embodiment, sequestration 432 is an underground geological formation that includes at least a partially depleted hydrocarbon reservoir. In a related embodiment, at least some of the transferred carbon dioxide rich stream is injectable into the hydrocarbon reservoir, to aid in enhanced oil recovery. In another example, the sequestration site is a region on top of a seabed, at a depth greater than three kilometers below sea level. In yet another example, the sequestration site is a region below a seabed.

Figure 5:
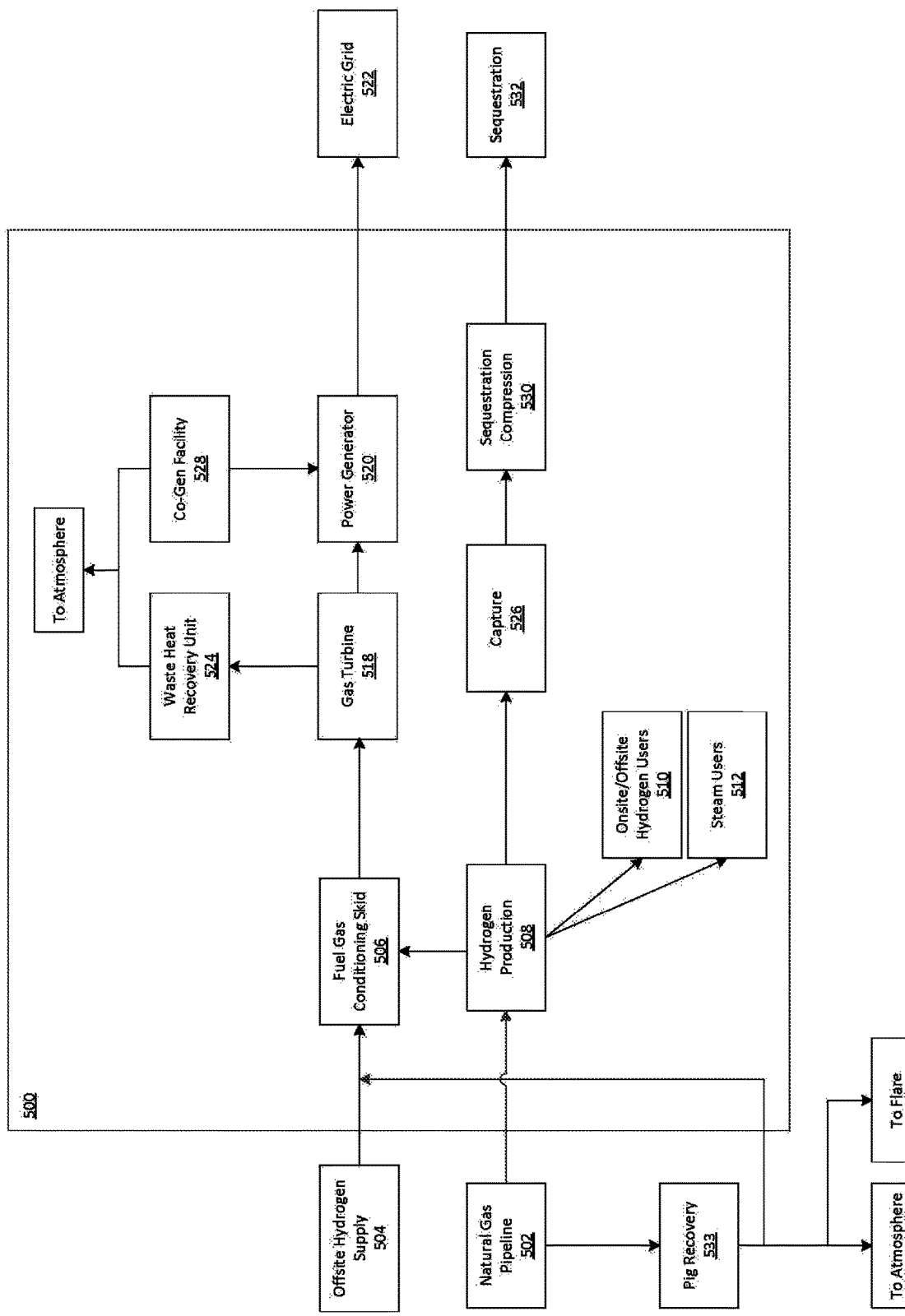
FIG. 5 illustrates an exemplary schematic of a power plant with hydrogen production and carbon capture.

FIG. 5 illustrates an exemplary schematic of a power plant 500 with hydrogen production. With comparison to power plant 400 in FIG. 4, power plant 500 is configured to use at least about 90% hydrogen by volume as fuel to gas turbine, as described herein. Power plant 500 further includes CO2 capture for the steam reformer.

Specifically, power plant 500 receives raw feed gas, such as natural gas, from a pipeline 502 (e.g., a natural gas pipeline). As with the facility 400 described above, natural gas pipeline 502 providing natural gas to facility 500 may have associated with it one or more pig recovery systems 533 or other pig-related systems, which may be significant sources of emissions that would typically be flared and/or vented to the atmosphere. In an embodiment, emissions from pig recovery system 533 are directed to facility 500, for example, to hydrogen production 508 or to fuel gas conditioning 506.

Natural gas is sent from the pipeline 502 to hydrogen production 508. (Some quantity of natural gas may also pass directly from pipeline 502 to fuel gas conditioning skid 506.) When natural gas is directed to hydrogen production 508, it can advantageously be used by a steam reformer as feedstock for a reformer. Specifically, in an embodiment, hydrogen production 508 is a steam reformer, such as a methane gas reformer, which is configured to generate hydrogen on-site. It should be appreciated that, in additional or alternative embodiments, hydrogen production 508 could be produced via other means, such as via an electrolysis unit whereby water is split into hydrogen and oxygen through the use of electricity. Likewise, it should be appreciated that, in additional or alternative embodiments, hydrogen production 508 could be offsite, such as via an offsite supply of hydrogen 504, whereby hydrogen may come into the LNG facility via pipeline, railcar, ship or other convenient means.

With that in mind, hydrogen production 508, such as via the steam reformer, allows for high temperature steam to react with methane, in the presence of a catalyst, to produce hydrogen, carbon monoxide, and carbon dioxide. Additional processes can be incorporated with hydrogen production 508, such as a water-gas shift reaction and/or pressure swing adsorption, to increase the yield of hydrogen. Excess hydrogen may be generated on-site from the steam reformer. Such hydrogen may be stored in an on-site storage tank, and may be sent for consumption by others such as onsite/offsite hydrogen users 510 within plant 500. Excess steam from hydrogen production 508 may be directed to various steam user 512, such as those described above.

Hydrogen may be provided to gas turbine 518 as fuel in high concentrations (or to the fuel gas conditioning skid 506 prior to the gas turbine 518), for optimal combustion. It should be appreciated that additional hydrogen may be provided, beyond the supply from hydrogen production 508, such as from offsite hydrogen supply 504.

Fuel gas conditioning skid 506 takes streams hydrogen, and optionally some amount of natural gas, and adjusts various physical conditions (e.g., temperatures, pressures, blends, and the like) to ensure that the gasses are conditioned for optimal combustion in a gas turbine 518.

Continuing on with respect to hydrogen production 508, for example, the fuel provided to gas turbine 518 may be a hydrogen-enriched hydrocarbon fuel. In an embodiment, within plant 500, fuel provided to gas turbine 518 is at least 90 percent hydrogen by volume. The balance (i.e., up to about 10% by volume) of the fuel gas stream may also include CO2, N2 and/or oxygen in any proportions. In a further embodiment, fuel provided to gas turbine 518 is at least 95 percent hydrogen by volume.

In an embodiment, plant 500 further includes one or more power generators 520, such as electric generators, whereby gas turbine 518 is coupled to the one or more electric generators 520; in this embodiment, facility 500 functions as a natural gas power generation facility. Namely, power from gas turbine 518 is transferred to power generator 520, which delivers this electricity to an external electric grid 522.

Once combusted, gas from the gas turbine 518 may pass to a waste heat recovery unit 524. The waste heat recovery unit 524 uses heat generated by a combustion process, such as via combustion in gas turbine 518, to heat up a heat medium (e.g., hot oil or steam). The heated medium is then used in various processes throughout facility 500 where additional heat is required (e.g., amine regeneration, dehydration regeneration, and the like for pretreatment 500).

In an embodiment, waste heat recovery unit 524 communicates with a cogeneration unit 528, which uses the waste heat from gas turbine 518 to generate steam that, in turn, rotates a generator, such as power generator 520 or another generator. The electricity can then be used in other parts of the facility 500 or, alternatively, be sent to the electric grid 522.

Combusted gas from the gas turbine 518 may eventually be vented to the atmosphere. Since the combustion gas from the gas turbine 518 is relatively low in carbon dioxide and other greenhouse gases, for example, as low as about 3.0% by volume, or more preferably even as low as less than about 0.1% by volume (as the hydrogen concentration in the gas turbine fuel approaches 100%), this stream of combusted gas need not be further treated in a post-combustion capture unit to remove carbon dioxide, and the overall greenhouse gas emissions from facility 500 will not be greatly increased by such venting of combustion gases to the atmosphere.

Meanwhile, a carbon dioxide containing gas from hydrogen production 508 passes to capture facility 526, which generates a carbon dioxide rich stream from the products of hydrogen production 508. In an alternative embodiment, capture facility 526 may in addition receive combustion gases from gas turbine 518. Capture facility 526, similar to the capture units discussed above, generates a carbon dioxide rich stream using an amine process to absorb carbon dioxide. Specifically, it will be appreciated that there are different types of amine depending on the relative concentrations of carbon dioxide in the flue gas stream. Natural gas fired turbines typically produce a relatively less concentrated carbon dioxide stream (e.g., approximately less than 5%) as compared to a natural gas steam methane reformer 508 (e.g., approximately 25%) and thus would generally use a different mixture to absorb the carbon dioxide. Other processes can additionally or alternatively include use of ammonia or other related materials. For example, capture may include a chilled ammonia process for absorbing CO2, wherein excess steam is directable to the capture unit to provide heat for regenerating ammonia absorbent.

In an embodiment, capture facility 526 includes an amine absorber and liquid amine absorbent for absorbing carbon dioxide. In a related embodiment, hydrogen production 508 generates excess steam, which is directable to capture facility 526; this excess steam provides heat to capture facility for regenerating the liquid amine absorbent.

After capture, a carbon dioxide rich gas passes to sequestration compression unit 530. More specifically, sequestration compression unit 530 includes one or more knockout drums for collecting any remaining liquid in the gas stream. Sequestration compression unit 530 further includes at least one compressor, configured to compress the carbon dioxide rich stream, which may be then sent to a pipeline for off-site sequestration 532. By sending the carbon dioxide rich stream to some form of sequestration, overall greenhouse gas emissions from facility 500 are reduced. Other forms of sequestration (not shown in FIG. 5) may be implemented, including for example sending the CO2 rich gas to an on-site or off-site storage tank, to a tank mounted on a rail car, or a tank mounted on a truck-drawn trailer. After compression, the sequestered CO2 rich gas may advantageously be sold for a number of well-known applications and uses.

In an embodiment, sequestration compression unit 530 includes a compressor that is driven by steam generated from the steam reformer during hydrogen production 508. In a related embodiment, the compressor is driven by a hydrogen turbine configured to be driven by excess hydrogen, derived from the steam reformer during hydrogen production 508. In another embodiment, sequestration compression unit 530 includes a compressor that is driven by gas turbine 518. In yet another embodiment, sequestration compression unit 530 includes a compressor that is driven by an electric motor.

As previously noted, sequestration compression unit 530 sends the carbon dioxide rich stream away from facility 500 for off-site sequestration 532. In an embodiment, sequestration 532 is an underground geological formation that includes at least a partially depleted hydrocarbon reservoir. In a related embodiment, at least some of the transferred carbon dioxide rich stream is injectable into the hydrocarbon reservoir, to aid in enhanced oil recovery. In another example, the sequestration site is a region on top of a seabed, at a depth greater than three kilometers below sea level. In yet another example, the sequestration site is a region below a seabed.

As used in this specification, including the claims, the term "and/or" is a conjunction that is either inclusive or exclusive. Accordingly, the term "and/or" either signifies the presence of two or more things in a group or signifies that one selection may be made from a group of alternatives.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

The invention is claimed as follows:

1. A liquefied natural gas (LNG) production facility comprising:
    an acid gas removal unit configured to accept a raw feed natural gas and generate an acid gas stream, a flash gas stream, and a purified natural gas stream, wherein the acid gas stream is directable to a sequestration compression unit;
    a dehydration unit including a solid adsorbent, the dehydration unit configured to receive the purified natural gas stream from the acid gas removal unit and provide a dry purified natural gas stream;
    a heavies removal unit configured to receive the dry purified natural gas stream from the dehydration unit and produce a liquid condensate product and a vapor product;
    a condensation storage tank configured to receive the liquid condensate product from the heavies removal unit and allow for venting of a first boil off gas (BOG);
    a liquefaction unit configured to condense a natural gas vapor into a liquefied natural gas (LNG), the liquefaction unit comprising at least one electrically driven refrigerant compressor;
    an LNG storage tank configured to receive and store the LNG from the liquefaction unit and allow for venting of a second BOG;
    an LNG loading facility configured to receive the LNG from the LNG storage tank and transfer the LNG to a marine vessel comprising a marine LNG storage tank, the LNG loading facility further configured to allow for venting of a third BOG, at least one of the first BOG from the condensation storage tank or the third BOG from the LNG loading facility is directable as a feed to the sequestration compression unit; and
    the sequestration compression unit configured to compress and convey at least one CO2-rich stream towards a sequestration site,
    wherein the at least one CO2-rich stream is selected from the group consisting of the first BOG from the condensation storage tank, the second BOG from the LNG storage tank, the third BOG from the LNG loading facility, the vapor product from the heavies removal unit, the acid gas stream from the acid gas removal unit, the flash gas stream from the acid gas removal unit, and mixtures thereof, and
    the natural gas vapor condensed by the liquefaction unit is selected from the group consisting of the first BOG from the condensation storage tank, the second BOG from the LNG storage tank, the third BOG from the LNG loading unit, the vapor product from the heavies removal unit, and mixtures thereof.

2. The LNG production facility of claim 1, wherein the sequestration site comprises an underground geological formation comprising an at least partially depleted hydrocarbon reservoir.

3. The LNG production facility of claim 1, wherein the sequestration site comprises a region on top of a seabed and located at a depth greater than about 3.0 kilometers below a sea level.

4. The LNG production facility of claim 1, wherein the sequestration site comprises a region below a seabed.

5. The LNG production facility of claim 1, wherein the sequestration compression unit comprises an electric-driven compressor.

6. The LNG production facility of claim 1, wherein the acid gas removal unit includes an amine absorber and a liquid amine absorbent for absorbing CO2.

7. The LNG production facility of claim 1 further comprising a marine vent system adapted to receive a marine vessel tank gas from a marine LNG storage tank of a marine vessel and direct the marine vessel tank gas to feed any of:
    the sequestration compression unit;
    the liquefaction unit; or
    one or more facility flares,
    wherein the marine vessel tank gas comprises a BOG from one of the LNG, CO, CO2, N2 or mixtures thereof.

8. The LNG production facility of claim 4, wherein the seabed is located at a depth greater than about 3.0 kilometers below a sea level.

9. The LNG production facility of claim 1, wherein the acid gas removal unit includes a chilled ammonia process with an ammonia absorbent for absorbing CO2.

10. The LNG production facility of claim 1, where the LNG production facility is configured to receive a natural gas from a pig recovery system and direct the natural gas as a feed to the sequestration compression unit.

11. The LNG production facility of claim 1, wherein the LNG production facility is configured to direct at least one of the first, second, or third BOG to the sequestration compresssion unit.

12. A process of producing a liquefied natural gas in a liquefied natural gas (LNG) production facility comprising a liquefaction unit including at least one refrigerant compressor driven by an electric motor, and the LNG production facility further comprising a sequestration compression unit, an acid gas removal unit, a dehydration unit including a solid adsorbent, a heavies removal unit, a condensation storage tank, an LNG storage tank, and an LNG loading facility, the process comprising:
    accepting a raw feed natural gas and, generating an acid gas stream, a flash gas stream, and a purified natural gas stream by the acid gas removal unit;
    directing the acid gas stream to the sequestration compression unit;

receiving the purified natural gas stream from the acid gas removal unit and providing a dry purified natural gas stream by the dehydration unit;

receiving the dry purified natural gas stream from the dehydration unit and producing a liquid condensate product and a vapor product by the heavies removal unit;

receiving the liquid condensate product from the heavies removal unit and venting a first boil off gas (BOG) by the condensation storage tank;

condensing a natural gas vapor into a liquefied natural gas (LNG) by the liquefaction unit;

receiving and storing the LNG from the liquefaction unit and venting a second BOG by the LNG storage tank;

receiving the LNG from the LNG storage tank, transferring the LNG to a marine vessel comprising a marine LNG storage tank, and venting a third BOG by the LNG loading facility; and compressing and conveying at least one CO2-rich stream towards a sequestration site by the sequestration compression unit; and directing at least one of the first BOG from the condensation storage tank or the third BOG from the LNG loading facility as a feed to the sequestration compression unit, wherein the at least one CO2-rich stream is selected from the group consisting of the first BOG from the condensation storage tank, the second BOG from the LNG storage tank, the third BOG from the LNG loading facility, the vapor product from the heavies removal unit, the acid gas stream from the acid gas removal unit, the flash gas stream from the acid gas removal unit, and mixtures thereof, and the natural gas vapor condensed by the liquefaction unit is selected from the group consisting of the first BOG from the condensation storage tank, the second BOG from the LNG storage tank, the third BOG from the LNG loading unit, the vapor product from the heavies removal unit, and mixtures thereof.

13. The process of claim 12, wherein the sequestration site comprises an underground geological formation comprising an at least partially depleted hydrocarbon reservoir.

14. The process of claim 12, wherein the sequestration site comprises a region on top of a seabed, the region located at a depth greater than about 3.0 kilometers below a sea level.

15. The process of claim 12, wherein the sequestration site comprises a region below a seabed.

16. The process of claim 15, wherein the seabed is located at a depth greater than about 3.0 kilometers below a sea level.

17. The process of claim 12, wherein the sequestration compression unit comprises an electric-driven compressor.

18. The process of claim 12, wherein the acid gas removal unit comprises a chilled ammonia process with an ammonia absorbent for absorbing CO2, the process comprising absorbing the CO2 by the chilled ammonia process.

19. The process of claim 12, wherein the acid gas removal unit includes an amine absorber and a liquid amine absorbent for absorbing CO2, the process comprising absorbing the CO2 by the amine absorber and the liquid amine absorbent.

20. The process of claim 12 comprising directing the flash gas stream to the sequestration compression unit.

21. The process of claim 12 comprising directing each of the first, second, and third BOG to the liquefaction unit.

22. The process of claim 12, wherein the LNG production facility further comprises a marine vent system, the process further comprising receiving a marine vessel tank gas from a marine LNG storage tank of a marine vessel by the marine vent system, and directing the marine vessel tank gas to feed any of:
- the sequestration compression unit;
- the liquefaction unit; or
- one or more facility flares,
- wherein the marine vessel tank gas comprises a BOG from one of the LNG, CO, CO2, N2 or mixtures thereof.

* * * * *

UNITED STATES PATENT AND TRADEMARK OFFICE
CERTIFICATE OF CORRECTION

PATENT NO.         : 11,067,335 B1
APPLICATION NO.    : 17/130953
DATED              : July 20, 2021
INVENTOR(S)        : Ivan Van der Walt et al.

Page 1 of 1

It is certified that error appears in the above-identified patent and that said Letters Patent is hereby corrected as shown below:

On the Title Page

Column 1, Item (73):
CORRECT ASSIGNEE "NEXT CARBON SOIITIONS, LLC" TO "NEXT CARBON SOLUTIONS, LLC"

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*